United States Patent
Karidi et al.

(10) Patent No.: US 9,432,468 B2
(45) Date of Patent: Aug. 30, 2016

(54) SYSTEM AND METHOD FOR DESIGN AND DYNAMIC GENERATION OF A WEB PAGE

(75) Inventors: Ron Karidi, New York, NY (US); Dan Bar Shalom, Ra'anana (IL); Amir Zucker, Ra'anana (IL); Tal Goldberg, Ra'anana (IL); Joseph Mermelstein, Ra'anana (IL)

(73) Assignee: LivePerson, Inc., New York, NY (US)

(*) Notice: Subject to any disclaimer, the term of this patent is extended or adjusted under 35 U.S.C. 154(b) by 185 days.

(21) Appl. No.: 11/394,078

(22) Filed: Mar. 31, 2006

(65) Prior Publication Data

US 2007/0061412 A1    Mar. 15, 2007

Related U.S. Application Data

(60) Provisional application No. 60/716,535, filed on Sep. 14, 2005, provisional application No. 60/717,212, filed on Sep. 15, 2005.

(51) Int. Cl.
*G06F 15/16* (2006.01)
*H04L 29/08* (2006.01)
(Continued)

(52) U.S. Cl.
CPC ........... *H04L 67/22* (2013.01); *G06F 17/3089* (2013.01); *G06Q 30/02* (2013.01); *G06Q 30/0603* (2013.01)

(58) Field of Classification Search
CPC . H04L 67/22; H04L 67/02; G06F 17/30867; G06F 17/3087; G06Q 30/02; G06Q 30/0207; G06Q 30/0251; G06Q 30/0253; G06Q 30/0255; G06Q 30/0256; G06Q 30/0261; G06Q 30/0269; G06Q 30/0277; G06Q 30/0281; G06Q 30/0241; G06Q 30/0601; G06Q 30/06; G06Q 30/0641; G06Q 30/0224; G06Q 30/0631; H04M 3/5233
USPC ........ 709/201–204, 217, 219–220, 226, 246, 709/223–224; 705/26–29; 707/3–4, 10; 715/200–202, 204–206, 219–220, 240, 715/705, 708–711, 744–747, 810–811; 719/313, 317–318
See application file for complete search history.

(56) References Cited

U.S. PATENT DOCUMENTS

| | | |
|---|---|---|
| 4,881,261 A | 11/1989 | Oliphant et al. |
| 5,187,735 A | 2/1993 | Herrero Garcia et al. |

(Continued)

FOREIGN PATENT DOCUMENTS

| | | |
|---|---|---|
| EP | 840244 A1 | 5/1998 |
| EP | 1233361 A1 | 8/2002 |

(Continued)

OTHER PUBLICATIONS

Webmaster General, "Link to my website is in a frame with banner ad at the top", Nov. 11, 2003, <http://www.webmasterworld.com/forum10/3862.htm>.*

(Continued)

*Primary Examiner* — Waseem Ashraf
(74) *Attorney, Agent, or Firm* — Kilpatrick Townsend & Stockton LLP

(57) ABSTRACT

A system and method for dynamically generating a web page is disclosed. The web page includes a frame having content cells. Content for the content cells is provided based in part on business rules. A business rules engine processes, in real-time, an online interaction and determines appropriate content for the content cells. The business rules engine outputs a pointer to the content which is used to populate the content cell.

30 Claims, 13 Drawing Sheets

(51) Int. Cl.
  *G06F 17/30* (2006.01)
  *G06Q 30/02* (2012.01)
  *G06Q 30/06* (2012.01)

(56) References Cited

U.S. PATENT DOCUMENTS

| | | | |
|---|---|---|---|
| 5,206,903 A | 4/1993 | Kohler et al. | |
| 5,208,748 A | 5/1993 | Flores et al. | |
| 5,235,519 A | 8/1993 | Miura | |
| 5,239,462 A | 8/1993 | Jones et al. | |
| 5,262,941 A | 11/1993 | Saladin et al. | |
| 5,289,371 A | 2/1994 | Abel et al. | |
| 5,319,542 A | 6/1994 | King et al. | |
| 5,351,186 A | 9/1994 | Bullock et al. | |
| 5,372,507 A | 12/1994 | Goleh | |
| 5,375,055 A | 12/1994 | Togher et al. | |
| 5,387,783 A | 2/1995 | Mihm et al. | |
| 5,450,537 A | 9/1995 | Hirai et al. | |
| 5,517,405 A | 5/1996 | McAndrew et al. | |
| 5,563,805 A | 10/1996 | Arbuckle et al. | |
| 5,572,643 A | 11/1996 | Judson | |
| 5,581,702 A | 12/1996 | McArdle et al. | |
| 5,583,763 A * | 12/1996 | Atcheson et al. | 707/750 |
| 5,590,038 A | 12/1996 | Pitroda | |
| 5,592,378 A | 1/1997 | Cameron et al. | |
| 5,596,493 A | 1/1997 | Tone | |
| 5,611,052 A | 3/1997 | Dykstra et al. | |
| 5,636,346 A * | 6/1997 | Saxe | 705/1.1 |
| 5,664,115 A | 9/1997 | Fraser | |
| 5,668,953 A | 9/1997 | Sloo | |
| 5,678,002 A | 10/1997 | Fawcett et al. | |
| 5,694,163 A | 12/1997 | Harrison | |
| 5,696,907 A | 12/1997 | Tom | |
| 5,699,526 A | 12/1997 | Siefert | |
| 5,704,029 A | 12/1997 | Wright | |
| 5,710,887 A | 1/1998 | Chelliah et al. | |
| 5,715,402 A | 2/1998 | Popolo | |
| 5,724,155 A | 3/1998 | Saito | |
| 5,724,522 A | 3/1998 | Kagami et al. | |
| 5,727,048 A | 3/1998 | Hiroshima et al. | |
| 5,727,163 A | 3/1998 | Bezos | |
| 5,732,400 A | 3/1998 | Mandler et al. | |
| 5,745,654 A | 4/1998 | Titan | |
| 5,748,755 A | 5/1998 | Johnson et al. | |
| 5,758,328 A | 5/1998 | Giovannoli | |
| 5,760,771 A | 6/1998 | Blonder et al. | |
| 5,761,640 A | 6/1998 | Kalyanswamy et al. | |
| 5,761,649 A | 6/1998 | Hill | |
| 5,764,916 A | 6/1998 | Busey et al. | |
| 5,765,142 A | 6/1998 | Allred et al. | |
| 5,774,869 A | 6/1998 | Toader | |
| 5,774,870 A | 6/1998 | Storey | |
| 5,774,882 A | 6/1998 | Keen et al. | |
| 5,774,883 A | 6/1998 | Andersen et al. | |
| 5,778,164 A | 7/1998 | Watkins et al. | |
| 5,784,568 A | 7/1998 | Needham | |
| 5,793,365 A | 8/1998 | Tang et al. | |
| 5,794,207 A | 8/1998 | Walker et al. | |
| 5,796,393 A | 8/1998 | MacNaughton et al. | |
| 5,797,133 A | 8/1998 | Jones et al. | |
| 5,799,151 A | 8/1998 | Hoffer | |
| 5,805,159 A | 9/1998 | Bertram et al. | |
| 5,806,043 A | 9/1998 | Toader | |
| 5,812,769 A | 9/1998 | Graber et al. | |
| 5,815,663 A | 9/1998 | Uomini | |
| 5,818,907 A | 10/1998 | Maloney et al. | |
| 5,819,029 A | 10/1998 | Edwards et al. | |
| 5,819,235 A | 10/1998 | Tamai et al. | |
| 5,819,236 A | 10/1998 | Josephson | |
| 5,819,291 A | 10/1998 | Haimowitz et al. | |
| 5,825,869 A | 10/1998 | Brooks et al. | |
| 5,826,241 A | 10/1998 | Stein et al. | |
| 5,826,244 A | 10/1998 | Huberman | |
| 5,828,839 A | 10/1998 | Moncreiff | |
| 5,832,465 A | 11/1998 | Tom | |
| 5,835,087 A | 11/1998 | Herz et al. | |
| 5,838,682 A | 11/1998 | Dekelbaum et al. | |
| 5,838,910 A | 11/1998 | Domenikos et al. | |
| 5,839,117 A | 11/1998 | Cameron et al. | |
| 5,850,517 A | 12/1998 | Verkler et al. | |
| 5,852,809 A | 12/1998 | Abel et al. | |
| 5,857,079 A | 1/1999 | Claus et al. | |
| 5,859,974 A | 1/1999 | McArdle et al. | |
| 5,862,330 A | 1/1999 | Anupam et al. | |
| 5,866,889 A | 2/1999 | Weiss et al. | |
| 5,870,721 A | 2/1999 | Norris | |
| 5,878,403 A | 3/1999 | DeFrancesco et al. | |
| 5,895,454 A | 4/1999 | Harrington | |
| 5,903,641 A | 5/1999 | Tonisson | |
| 5,907,677 A | 5/1999 | Glenn et al. | |
| 5,911,135 A | 6/1999 | Atkins | |
| 5,916,302 A | 6/1999 | Dunn et al. | |
| 5,918,014 A | 6/1999 | Robinson | |
| 5,924,082 A | 7/1999 | Silverman et al. | |
| 5,930,776 A | 7/1999 | Dykstra et al. | |
| 5,940,811 A | 8/1999 | Norris | |
| 5,940,812 A | 8/1999 | Tengel et al. | |
| 5,943,416 A | 8/1999 | Gisby et al. | |
| 5,943,478 A | 8/1999 | Aggarwal et al. | |
| 5,945,989 A | 8/1999 | Freishtat et al. | |
| 5,948,061 A | 9/1999 | Merriman et al. | |
| 5,950,179 A | 9/1999 | Buchanan et al. | |
| 5,956,693 A | 9/1999 | Geerlings | |
| 5,958,014 A | 9/1999 | Cave | |
| 5,960,411 A | 9/1999 | Hartman et al. | |
| 5,963,625 A | 10/1999 | Kawecki et al. | |
| 5,963,635 A | 10/1999 | Szlam | |
| 5,966,699 A | 10/1999 | Zandi | |
| 5,970,475 A | 10/1999 | Barnes et al. | |
| 5,970,478 A | 10/1999 | Walker et al. | |
| 5,974,396 A | 10/1999 | Anderson | |
| 5,974,446 A | 10/1999 | Sonnenrich et al. | |
| 5,987,434 A | 11/1999 | Libman | |
| 5,991,740 A | 11/1999 | Messer | |
| 5,995,947 A | 11/1999 | Fraser et al. | |
| 6,000,832 A | 12/1999 | Franklin et al. | |
| 6,003,013 A | 12/1999 | Boushy | |
| 6,009,410 A * | 12/1999 | LeMole et al. | 705/14.54 |
| 6,014,644 A | 1/2000 | Erickson | |
| 6,014,645 A | 1/2000 | Cunningham | |
| 6,014,647 A | 1/2000 | Nizzari | |
| 6,016,504 A | 1/2000 | Arnold et al. | |
| 6,026,370 A | 2/2000 | Jermyn | |
| 6,028,601 A | 2/2000 | Machiraju et al. | |
| 6,029,141 A | 2/2000 | Bezos et al. | |
| 6,029,149 A | 2/2000 | Dykstra et al. | |
| 6,029,890 A | 2/2000 | Austin et al. | |
| 6,044,146 A | 3/2000 | Gisby et al. | |
| 6,044,360 A | 3/2000 | Picciallo | |
| 6,049,784 A | 4/2000 | Weatherly et al. | |
| 6,052,447 A | 4/2000 | Golden | |
| 6,052,730 A | 4/2000 | Felciano | |
| 6,055,573 A | 4/2000 | Gardenswartz et al. | |
| 6,058,375 A | 5/2000 | Park et al. | |
| 6,058,428 A | 5/2000 | Wang et al. | |
| 6,061,658 A | 5/2000 | Chou et al. | |
| 6,064,987 A | 5/2000 | Walker et al. | |
| 6,067,525 A | 5/2000 | Johnson et al. | |
| 6,070,149 A | 5/2000 | Tavor et al. | |
| 6,073,112 A | 6/2000 | Geerlings | |
| 6,076,100 A | 6/2000 | Cottrille et al. | |
| 6,078,892 A | 6/2000 | Anderson et al. | |
| 6,084,585 A | 7/2000 | Kraft et al. | |
| 6,085,126 A | 7/2000 | Mellgren, III et al. | |
| 6,085,195 A | 7/2000 | Hoyt et al. | |
| 6,088,686 A | 7/2000 | Walker et al. | |
| 6,105,007 A | 8/2000 | Norris | |
| 6,112,190 A | 8/2000 | Fletcher et al. | |
| 6,119,101 A | 9/2000 | Peckover | |
| 6,119,103 A | 9/2000 | Basch et al. | |
| 6,131,087 A | 10/2000 | Luke et al. | |
| 6,131,095 A | 10/2000 | Low et al. | |
| 6,134,318 A | 10/2000 | O'Neil | |
| 6,134,530 A | 10/2000 | Bunting et al. | |

(56) References Cited

U.S. PATENT DOCUMENTS

| | | | |
|---|---|---|---|
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 * | 7/2003 | MacPhail ..................... 715/738 |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,654,815 B1 * | 11/2003 | Goss ..................... H04L 29/06 709/248 |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shafiee et al. |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 * | 12/2004 | Hirsch ..................... 707/3 |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 * | 5/2005 | Tso ..................... G06Q 30/0207 709/218 |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 * | 1/2006 | Yen ..................... 709/203 |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 * | 7/2006 | Emens et al. ..................... 705/14.55 |
| 7,085,682 B1 | 8/2006 | Heller et al. |
| 7,092,959 B2 | 8/2006 | Chen |
| 7,106,850 B2 | 9/2006 | Campbell et al. |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,266,510 B1 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat et al. |
| 7,536,320 B2 * | 5/2009 | McQueen et al. ..................... 705/26 |
| 7,552,080 B1 | 6/2009 | Willard et al. |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,734,503 B2 | 6/2010 | Agarwal et al. |
| 7,734,632 B2 * | 6/2010 | Wang ..................... 707/749 |
| 7,739,149 B2 | 6/2010 | Freishtat et al. |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,958,066 B2 | 6/2011 | Pinckney et al. |
| 7,966,564 B2 | 6/2011 | Catlin et al. |
| 7,975,020 B1 * | 7/2011 | Green ..................... G06Q 30/0241 705/14.4 |

(56) References Cited

U.S. PATENT DOCUMENTS

| | | |
|---|---|---|
| 8,010,422 B1 | 8/2011 | Lascelles et al. |
| 8,185,544 B2 | 5/2012 | Oztekin et al. |
| 8,260,846 B2 | 9/2012 | Lahav |
| 8,266,127 B2 | 9/2012 | Mattox et al. |
| 8,386,340 B1 | 2/2013 | Feinstein |
| 8,392,580 B2 | 3/2013 | Allen et al. |
| 8,738,732 B2 | 5/2014 | Karidi |
| 8,762,313 B2 | 6/2014 | Lahav et al. |
| 8,799,200 B2 | 8/2014 | Lahav |
| 8,805,844 B2 | 8/2014 | Schorzman et al. |
| 8,805,941 B2 | 8/2014 | Barak et al. |
| 8,868,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1* | 8/2001 | Greening et al. ............... 705/10 |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1* | 10/2001 | Heilman, Jr. .................... 705/37 |
| 2001/0044751 A1* | 11/2001 | Pugliese, III .......... G06Q 30/02 705/14.1 |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0010625 A1* | 1/2002 | Smith ..................... G06Q 30/02 705/14.52 |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1* | 3/2002 | Sankuratripati et al. ...... 709/224 |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1* | 7/2002 | Shires ................. H04M 3/5191 379/265.04 |
| 2002/0091832 A1* | 7/2002 | Low et al. ..................... 709/227 |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1* | 10/2002 | Shaya et al. .................... 705/26 |
| 2002/0167539 A1 | 11/2002 | Brown et al. |
| 2003/0004781 A1 | 1/2003 | Mallon |
| 2003/0009768 A1* | 1/2003 | Moir ............................ 725/112 |
| 2003/0011641 A1* | 1/2003 | Totman et al. ................ 345/810 |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1* | 2/2003 | Kaddeche et al. ............... 705/14 |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1* | 4/2003 | Kang et al. .................... 715/500 |
| 2003/0105826 A1 | 6/2003 | Mayraz |
| 2003/0110130 A1* | 6/2003 | Pelletier ......................... 705/50 |
| 2003/0140037 A1 | 7/2003 | Deh-Lee |
| 2003/0149581 A1* | 8/2003 | Chaudhri et al. .................. 705/1 |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1* | 9/2003 | Trent et al. ..................... 705/50 |
| 2003/0195848 A1 | 10/2003 | Felger |
| 2003/0217332 A1* | 11/2003 | Smith et al. .................. 715/513 |
| 2003/0221163 A1 | 11/2003 | Glover et al. |
| 2003/0233425 A1* | 12/2003 | Lyons et al. ................... 709/217 |
| 2004/0034567 A1 | 2/2004 | Gravett |
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0141016 A1* | 7/2004 | Fukatsu et al. ................ 345/856 |
| 2004/0153368 A1 | 8/2004 | Freishtat et al. |
| 2004/0163101 A1* | 8/2004 | Swix et al. ....................... 725/9 |
| 2004/0167928 A1* | 8/2004 | Anderson et al. .......... 707/104.1 |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0260574 A1* | 12/2004 | Gross ................................ 705/1 |
| 2005/0004864 A1 | 1/2005 | Lent et al. |
| 2005/0014117 A1 | 1/2005 | Stillman |
| 2005/0033641 A1* | 2/2005 | Jha et al. ......................... 705/14 |
| 2005/0033728 A1 | 2/2005 | James |
| 2005/0044149 A1 | 2/2005 | Regardie et al. |
| 2005/0096963 A1 | 5/2005 | Myr |
| 2005/0096997 A1 | 5/2005 | Jain et al. |
| 2005/0097089 A1* | 5/2005 | Nielsen et al. ..................... 707/3 |
| 2005/0102177 A1* | 5/2005 | Takayama .......... G06Q 30/0241 705/14.4 |
| 2005/0114195 A1 | 5/2005 | Bernasconi |
| 2005/0132205 A1 | 6/2005 | Palliyil et al. |
| 2005/0138115 A1 | 6/2005 | Llamas et al. |
| 2005/0171861 A1* | 8/2005 | Bezos et al. ..................... 705/26 |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1* | 9/2005 | Wada et al. ................... 709/220 |
| 2005/0216342 A1* | 9/2005 | Ashbaugh ....................... 705/14 |
| 2005/0234761 A1 | 10/2005 | Pinto |
| 2005/0256955 A1* | 11/2005 | Bodwell et al. ............... 709/224 |
| 2005/0262065 A1* | 11/2005 | Barth et al. ........................ 707/3 |
| 2005/0288943 A1* | 12/2005 | Wei et al. .......................... 705/1 |
| 2006/0015390 A1 | 1/2006 | Rijisinghani et al. |
| 2006/0021009 A1 | 1/2006 | Lunt |
| 2006/0026147 A1* | 2/2006 | Cone et al. ........................ 707/3 |
| 2006/0026237 A1* | 2/2006 | Wang et al. ................... 709/206 |
| 2006/0041378 A1 | 2/2006 | Chen |
| 2006/0041476 A1 | 2/2006 | Zheng |
| 2006/0041562 A1* | 2/2006 | Paczkowski et al. .......... 707/10 |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277102 A1* | 12/2006 | Christenson .................. 715/760 |
| 2006/0282327 A1* | 12/2006 | Neal et al. ...................... 705/14 |
| 2006/0282328 A1 | 12/2006 | Gerace et al. |
| 2006/0284378 A1 | 12/2006 | Snow et al. |
| 2006/0284892 A1* | 12/2006 | Sheridan ........................ 345/661 |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061421 A1 | 3/2007 | Karidi |
| 2007/0073585 A1 | 3/2007 | Apple et al. |
| 2007/0094228 A1 | 4/2007 | Nevin et al. |

(56) References Cited

U.S. PATENT DOCUMENTS

| | | |
|---|---|---|
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0206086 A1 | 9/2007 | Baron et al. |
| 2007/0239527 A1 | 10/2007 | Nazer et al. |
| 2007/0250585 A1 | 10/2007 | Ly et al. |
| 2007/0260596 A1 | 11/2007 | Koran et al. |
| 2007/0265873 A1 | 11/2007 | Sheth et al. |
| 2008/0021816 A1 | 1/2008 | Lent et al. |
| 2008/0033794 A1* | 2/2008 | Ou et al. ............. 705/14 |
| 2008/0033941 A1 | 2/2008 | Parrish |
| 2008/0040225 A1* | 2/2008 | Roker ............. 705/14 |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0307003 A1 | 12/2009 | Benyamin et al. |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0119379 A1 | 5/2010 | Willcock |
| 2010/0125657 A1 | 5/2010 | Dowling et al. |
| 2010/0205024 A1 | 8/2010 | Shachar et al. |
| 2010/0255812 A1 | 10/2010 | Nanjundaiah et al. |
| 2010/0281008 A1 | 11/2010 | Braunwarth |
| 2010/0306043 A1 | 12/2010 | Lindsay et al. |
| 2011/0041168 A1 | 2/2011 | Murray et al. |
| 2011/0055207 A1 | 3/2011 | Schorzman et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0271175 A1 | 11/2011 | Lavi et al. |
| 2011/0307331 A1 | 12/2011 | Richard et al. |
| 2011/0320715 A1 | 12/2011 | Ickman et al. |
| 2012/0012358 A1 | 1/2012 | Horan et al. |
| 2012/0042389 A1 | 2/2012 | Bradley et al. |
| 2012/0059722 A1 | 3/2012 | Rao |
| 2012/0130918 A1 | 5/2012 | Gordon |
| 2012/0136939 A1 | 5/2012 | Stern et al. |
| 2012/0150973 A1 | 6/2012 | Barak |
| 2012/0195422 A1 | 8/2012 | Famous |
| 2012/0254301 A1 | 10/2012 | Fiero |
| 2013/0013362 A1 | 1/2013 | Walker et al. |
| 2013/0036202 A1 | 2/2013 | Lahav |
| 2013/0054707 A1 | 2/2013 | Muszynski et al. |
| 2013/0117804 A1 | 5/2013 | Chawla |
| 2013/0132194 A1 | 5/2013 | Rajaram |
| 2013/0182834 A1 | 7/2013 | Lauffer |
| 2013/0212497 A1 | 8/2013 | Zelenko et al. |
| 2013/0238714 A1 | 9/2013 | Barak et al. |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2014/0115466 A1 | 4/2014 | Barak et al. |
| 2014/0222888 A1 | 8/2014 | Karidi |
| 2014/0250051 A1 | 9/2014 | Lahav et al. |
| 2014/0310229 A1 | 10/2014 | Lahav |
| 2014/0372240 A1 | 12/2014 | Freishtat et al. |
| 2015/0012602 A1 | 1/2015 | Schorzman et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0149571 A1 | 5/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0278837 A1 | 10/2015 | Lahav et al. |
| 2016/0055277 A1 | 2/2016 | Lahav et al. |

FOREIGN PATENT DOCUMENTS

| | | |
|---|---|---|
| EP | 1276 064 A2 | 1/2003 |
| EP | 1549025 A1 | 6/2005 |
| EP | 1 840 803 A1 | 10/2007 |
| EP | 1845436 A2 | 10/2007 |
| EP | 1850284 A1 | 10/2007 |
| FR | 2 950 214 A1 | 3/2011 |
| JP | 9288453 A2 | 11/1997 |
| JP | 2004-054533 | 2/2004 |
| JP | 2010/128877 | 6/2010 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 0127825 A1 | 4/2001 |
| WO | 01/35272 A2 | 5/2001 |
| WO | 02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A2 | 12/2010 |
| WO | 2011/127049 A1 | 10/2011 |
| WO | 2013/119808 A1 | 8/2013 |

(56) References Cited

FOREIGN PATENT DOCUMENTS

| | | |
|---|---|---|
| WO | 2013/158830 A1 | 10/2013 |
| WO | 2013/163426 A1 | 10/2013 |
| WO | 2015/021068 A2 | 2/2015 |

OTHER PUBLICATIONS

Non-Final Office Action of Jan. 30, 2014 for U.S. Appl. No. 13/413,158, 19 pages.
Notice of Allowance of Feb. 12, 2014 for U.S. Appl. No. 13/157,936, 33 pages.
Final Office Action of Feb. 19, 2014 for U.S. Appl. No. 13/961,072, 35 pages.
Non-Final Office Action of Feb. 20, 2014 for U.S. Appl. No. 10/980,613, 43 pages.
Notice of Allowance of Feb. 28, 2014 for U.S. Appl. No. 09/922,753, 13 pages.
Notice of Allowance of Mar. 25, 2014 for U.S. Appl. No. 12/504,265, 31 pages.
Notice of Allowance of Mar. 31, 2014 for U.S. Appl. No. 12/725,999, 41 pages.
Notice of Allowance of Apr. 1, 2014 for U.S. Appl. No. 13/413,197, 32 pages.
Chartrand Sabra, "A new system seeks to ease the bottleneck in the customer-service information highway," The New York Times (Apr. 30, 2001), 2 pages.
Just Answer (2004 Faq) Archive.org cache of www.justanswer.com circa (Dec. 2004), 8 pages.
Pack Thomas, "Human Search Engines the next Killer app," (Dec. 1, 2000) Econtent DBS vol. 23; Issue 6, 7 pages.
match.com "Match.com Launches Match.com Advisors," PR Newswire (Oct. 14, 2003), 2 pages.
SITEL, "SITEL to Provide Live Agent Support Online for Expertcity.com," PR Newswire (Feb. 28, 2000), 2 pages.
Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).
Fairisaac, "How SmartForms for Blaze Advisor Works," www.fairisaac.com 12 pages (Jan. 2005).
Mesbah A et al., "A Component- and Push-Based Architectural Style for Ajax Applications," The Journal of Systems & Software, 81 (12): pp. 2194-2209, Elsevier North Holland, New York, NY US (Dec. 2008).
Oracle Fusion Middleware Administrator's Guide for Oracle SOA (Oracle Guide) Suite 11g Release 1 (11.1.1) Part No. E10226-02 www.docs.oracle.com (Oct. 2009), 548 pages.
"OAuth core 1.0 Revision A [XP002570263]," OAuth Core Workgroups, pp. 1-27 www.ouath.net/core/1.0a/ (retrieved Jan. 31, 2013), 24 pages.
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony—It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Information week, (Oct. 4, 1999) 2 pages.
Kirkpatrick, K., "Electronic Exchange 2000, The," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.

Douglas Armstrong, Firstar Web site helps add up future, Milwaukee Journal Sentinel, (Mar. 28, 1996) 3 pages.
redhat_.com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware—Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customers Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog_ File 621: New Product Announcement, 3 pages.
Handley, John, "Credit Review Lets the Numbers Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.
What the Credit Bureau is Saying About You: If a Mistake Sneaks Into Your Record, You May Not Know About it Until You Get Turned Down for Credit, Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.
What is a FICO Score?, http://www.aspeenloan.com (2009) 1 page.
"Credit", The New Encyclopedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards—and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.

(56) References Cited

OTHER PUBLICATIONS

Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n. 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet Visa," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-_inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action issued Oct. 8, 2008, 14 pages.
"Sample Experian Credit Report" by Consumer Information consumerinfo.com (Jul. 9, 1998) 4 pages.
Plaintiffs Original Complaint, *Nextcard, LLC* v. *Liveperson, Inc.*; Civil Action No. 2:08-cv- 00184-TJW, In the U.S. District Court for the Eastern District of Texas, Marshall Division, filed Apr. 30 2008 (7 pages).
Amended Complaint and Jury Demand; *Liveperson, Inc.* v. *Nextcard, LLC, et al.*; Civil Action No. 08-062 (GMS), in the U.S. District Court for the District of Delaware, filed Mar. 18, 2008 (5 pages).
Plaintiffs Second Amended Complaint; *Nextcard, LLC* v. *American Express Company, et al*; Civil Action No. 2:07-cv-354 (TJW); In the U.S. District Court for the Eastern District of Texas, Marshall Division, filed Apr. 9, 2008 (12 pages).

Defendants HSBC North America Holdings Inc.'s and HSBC USA Inc's Answer, Affirmative Defenses and Counterclaims to Plaintiffs Second Amended Complaint; *Nextcard, LLC* v. *American Express Company, et al*; Civil Action No. 2:07-cv-354 (TJW); In the U.S. District Court for the Eastern District of Texas, Marshall Division filed (Apr. 28, 2008), 13 pages.
Answer and Counterclaims of Defendant DFS Services LLC; *Nextcard, LLC* v. *American Express Company, et al*; Civil Action No. 2:07-cv-354 (TJW); In the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; *Nextcard, LLC*v. *American Express Company, et al*; Civil Action No. 2:07-cv-354 (TJW); In the U.S. District Court for the Eastern District of Texas, Marshall Division, filed Apr. 28, 2008, 10 pages.
Plaintiffs Second Amended Reply to Counterclaims of Defendants HSBC North America Holdings Inc. and HSBC USA Inc.; *Nextcard, LLC* v. *American Express Company, et al*; Civil Action No. 2:07-cv-354 (TJW); In the U.S. District Court for the Eastern District of Texas, Marshall Division, filed May 14, 2008, 5 pages.
Plaintiffs Second Amended Reply to Counterclaims of Defendant DFS Services LLC; *Nextcard, LLC* v. *American Express Company, et al*; Civil Action No. 2:07-cv-354 (TJW); In the U.S. District Court for the Eastern District of Texas, Marshall Division, filed May 14, 2008 (71 pages).
Plaintiffs Second Amended Reply to Counterclaims of Defendant American Express Company; *Nextcard, LLC* v. *American Express Company, et al*; Civil Action No. 2:07-cv-354 (TJW); In the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
Kim S. Nash "Call all Customers." Computerworld, 32 (1), 25-28 (Dec. 1997), 2 pages.
PRN: "First American Financial Acquires Tele-Track Inc.," PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proquest #11267840, 5 pages.
"ESL Federal Credit Union Inaugurates Internet Target Marketing." PR Newswire p. 4210 (Oct. 6, 1998), 3 pages.

(56) References Cited

OTHER PUBLICATIONS

"Welcome to eStara—The Industry Leader in Click to Call and Call Tracking Solutions," e-Stara, Inc., retrieved from www.estara.com on Mar. 21, 2013, 1 page.

"Push to Talk Live Now! From your website" iTalkSystem, Inc., retrieved from www.italksystems.com on Mar. 21, 2013, 1 page.

Richardson et al., "Predicting Clicks: Estimating the Click-Through Rate for New Ads," (May 2007) 9 pages.

"Welcome to Keen" retrieved from www.archive.org/web/20010302014355/http://www.keen.com/ on Jan. 25, 2013, 1 page.

Christophe Destruel, Herve Luga, Yves Duthen, Rene Caubet. "Classifiers based system for interface evolution." Expersys Conference, 265-270 (1997), 6 pages.

Ulla de Stricker, Annie Joan Olesen. "Is Management Consulting for You?" Searcher, 48-53 (Mar. 2005), 6 pages.

Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.

Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.

Elizabeth Sklar Rozier, Richard Alterman. "Participatory Adaptation." CHI, 97, 261-262 (Mar. 22-27, 1997), 2 pages.

Frank White. "The User Interface of Expert Systems: What Recent Research Tells Us." Library Software Review, vol. 13, No. 2, p. 91-98 (Summer 1994) 8 pages.

Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.

International Search Report and Written Opinion for PCT Application No. PCT/US2013/041147, mailed Jul. 30, 2013, 9 pages.

International Search Report and Written Opinion for PCT Application No. PCT/US2013/037086, mailed Jul. 12, 2013, 9 pages.

International Search Report and Written Opinion for PCT Application No. PCT/US2013/29389, mailed Jul. 24, 2013, 8 pages.

International Search Report and Written Opinion for PCT Application No. PCT/US2013/038212, mailed Jul. 17, 2013, 11 pages.

International Search Report for PCT Application No. PCT/US03/41090, mailed on Sep. 1, 2004, 3 pages.

International Search Report for PCT Application No. PCT/US05/40012, mailed on Oct. 5, 2007, 2 pages.

International Preliminary Report on Patentability for PCT Application No. PCT/US2006/039630, dated Apr. 16, 2008, 4 pages.

International Search Report for PCT Application No. PCT/US2011/031239, mailed on Jul. 7, 2011, 3 pages.

International Search Report for PCT Application No. PCT/US2011/064946, mailed on Jun. 22, 2012, 3 pages.

International Preliminary Report on Patentability for PCT Application No. PCT/US2011/031239, dated Oct. 9, 2012, 8 pages.

Non-Final Office Action of Dec. 11, 2008 for U.S. Appl. No. 11/394,078, 15 pages.

Non-Final Office Action of Jun. 22, 2012 for U.S. Appl. No. 13/080,324, 9 pages.

Non-Final Office Action of Aug. 15, 2012 for U.S. Appl. No. 12/967,782, 31 pages.

Non-Final Office Action of Jul. 29, 2011 for U.S. Appl. No. 12/608,117, 20 pages.

Final Office Action of Apr. 4, 2012 for U.S. Appl. No. 12/608,117, 25 pages.

Non-Final Office Action of Apr. 24, 2004 for U.S. Appl. No. 09/922,753, 16 pages.

Final Office Action of Oct. 14, 2004 for U.S. Appl. No. 09/922,753, 13 pages.

Non-Final Office Action of May 17, 2005 for U.S. Appl. No. 09/922,753, 13 pages.

Non-Final Office Action of Mar. 14, 2006 for U.S. Appl. No. 09/922,753, 13 pages.

Final Office Action of Jul. 26, 2006 for U.S. Appl. No. 09/922,753, 13 pages.

Non-Final Office Action of Aug. 13, 2008 for U.S. Appl. No. 09/922,753, 10 pages.

Final Office Action of Apr. 23, 2009 for U.S. Appl. No. 09/922,753, 11 pages.

Non-Final Office Action of Jul. 21, 2009 for U.S. Appl. No. 09/922,753, 10 pages.

Final Office Action of Feb. 18, 2010 for U.S. Appl. No. 09/922,753, 9 pages.

Non-Final Office Action of Apr. 25, 2011 for U.S. Appl. No. 09/922,753, 9 pages.

Final Office Action of Nov. 25, 2011 for U.S. Appl. No. 09/922,753, 10 pages.

Non-Final Office Action of Aug. 7, 2007 for U.S. Appl. No. 10/980,613, 16 pages.

Non-Final Office Action of May 15, 2008 for U.S. Appl. No. 10/980,613, 23 pages.

Non-Final Office Action of Apr. 30, 2012 for U.S. Appl. No. 12/504,265, 16 pages.

Final Office Action of Aug. 28, 2012 for U.S. Appl. No. 12/504,265, 28 pages.

Final Office Action of Feb. 14, 2013 for U.S. Appl. No. 13/080,324, 11 pages.

Final Office Action of Apr. 11, 2013 for U.S. Appl. No. 12/967,782, 18 pages.

Non-Final Office Action of Jun. 12, 2013 for U.S. Appl. No. 12/608,117, 56 pages.

Non-Final Office Action of Jul. 8, 2013 for U.S. Appl. No. 13/413,197, 10 pages.

Non-Final Office Action of Jun. 27, 2013 for U.S. Appl. No. 12/504,265 , 11 pages.

Non-Final Office Action of Jun. 20, 2013 for U.S. Appl. No. 13/157,936, 19 pages.

Non-Final Office Action of May 10, 2013 for U.S. Appl. No. 13/563,708, 20 pages.

Non-Final Office Action of Mar. 30, 2013 for U.S. Appl. No. 11/360,530, 23 pages.

Non-Final Office Action of Dec. 5, 2013 for U.S. Appl. No. 12/967,782, 14 pages.

Final Office Action of Oct. 21, 2013 for U.S. Appl. No. 12/504,265 14 pages.

Non-Final Office Action of Oct. 30, 2013 for U.S. Appl. No. 13/961,072, 10 pages.

Notice of Allowance of Jan. 3, 2014 for U.S. Appl. No. 11/360,530, 29 pages.

Final Office Action of Jan. 22, 2014 for U.S. Appl. No. 12/608,117, 45 pages.

Final Office Action of Jan. 27, 2014 for U.S. Appl. No. 13/563,708, 35 pages.

Non-Final Office Action of Dec. 4, 2014 for U.S. Appl. No. 14/275,698, 7 pages.

Non-Final Office Action of Dec. 23, 2014 for U.S. Appl. No. 13/961,072, 11 pages.

International Preliminary Report on Patentability for PCT Application No. PCT/US2013/29389, mailed Sep. 18, 2014, 6 pages.

International Preliminary Report on Patentability for PCT Application No. PCT/US2013/025142, mailed Aug. 21, 2014, 5 pages.

Non-Final Office Action of Jul. 31, 2014 for U.S. Appl. No. 13/080,324, 12 pages.

Notice of Allowance of Aug. 18, 2014 for U.S. Appl. No. 12/967,782, 17 pages.

Non-Final Office Action of Aug. 21, 2014 for U.S. Appl. No. 10/980,613, 17 pages.

Notice of Allowance of Sep. 17, 2014 for U.S. Appl. No. 13/413,158, 14 pages.

Notice of Allowance of Sep. 26, 2014 for U.S. Appl. No. 13/563,708, 8 pages.

International Preliminary Report on Patentability for PCT Application No. PCT/US2013/038212, mailed Nov. 6, 2014, 8 pages.

(56) References Cited

OTHER PUBLICATIONS

International Preliminary Report on Patentability for PCT Application No. PCT/US2013/041147, mailed Jan. 22, 2015, 21 pages.
International Search Report for PCT Application No. PCT/US2013/025142, mailed Jun. 5, 2013, 4 pages.
International Search Report and Written Opinion for PCT Application No. PCT/US14/49822, mailed Feb. 27, 2015, 11 pages.
Non-Final Office Action of Jan. 14, 2015 for U.S. Appl. No. 14/288,258, 12 pages.
Non-Final Office Action of Jan. 21, 2015 for U.S. Appl. No. 14/500,502, 8 pages.
Final Office Action of Jan. 29, 2015 for U.S. Appl. No. 14/245,400, 28 pages.
Final Office Action of Mar. 12, 2015 for U.S. Appl. No. 13/080,324, 13 pages.
Non-Final Office Action of Mar. 13, 2015 for U.S. Appl. No. 13/841,434, 26 pages.
Non-Final Office Action of Apr. 9, 2015 for U.S. Appl. No. 13/830,719, 24 pages.
Notice of Allowance of Mar. 30, 2015 for U.S. Appl. No. 14/275,698, 11 pages.
Non-Final Office Action of Apr. 6, 2015 for U.S. Appl. No. 14/322,736, 13 pages.
Non-Final Office Action of May 7, 2015 for U.S. Appl. No. 13/829,708, 16 pages.
Final Office Action of May 8, 2015 for U.S. Appl. No. 10/980,613, 18 pages.
Non-Final Office Action of May 13, 2015 for U.S. Appl. No. 14/317,346, 21 pages.
Non-Final Office Acton of Jun. 2, 2015 for U.S. Appl. No. 12/608,117, 26 pages.
First Action Interview Pilot Program Pre-Interview Communication of Jun. 19, 2015 for U.S. Appl. No. 14/244,830, 7 pages.
International Preliminary Report on Patentability for PCT Application No. PCT/US2014/049822, mailed Feb. 18, 2016, 7 pages.
Non-Final Office Action of Jan. 5, 2016 for U.S. Appl. No. 14/245,400, 33 pages.
Notice of Allowance of Jan. 7, 2016 for U.S. Appl. No. 14/313,511, 5 pages.
First Action Interview Pilot Program Pre-Interview Communication of Jan. 12, 2016 for U.S. Appl. No. 14/753,496, 3 pages.
Notice of Allowance of Jan. 20, 2016 for U.S. Appl. No. 13/829,708, 11 pages.
Final Office Action of Jan. 29, 2016 for U.S. Appl. No. 14/711,609; 15 pages.
Final Office Action of Jan. 29, 2016 for U.S. Appl. No. 14/500,537; 15 pages.
Non-Final Office Action of Feb. 12, 2016 for U.S. Appl. No. 13/080,324, 15 pages.
Notice of Allowance of Mar. 16, 2016 for U.S. Appl. No. 14/582,550; 9 pages.
Notice of Allowance of Mar. 21, 2016 for U.S. Appl. No. 14/753,496; 5 pages.
Extended European Search Report dated Jul. 7, 2015 for European Patent Application No. 15161694.3; 8 pages.
Non-Final Office Action of Jul. 20, 2015 for U.S. Appl. No. 14/711,609; 12 pages.
Non-Final Office Action of Jul. 20, 2015 for U.S Appl. No. 14/500,537; 12 pages.
Final Office Action of Jul. 31, 2015 for U.S. Appl. No. 14/317,346, 13 pages.
Final Office Action of Aug. 10, 2015 for U.S. Appl. No. 13/961,072, 12 pages.
Non-Final Office Action of Aug. 14, 2015 for U.S. Appl. No. 14/543,397, 12 pages.
Non-Final Office Action of Aug. 18, 2015 for U.S. Appl. No. 14/570,963, 23 pages.
Non-Final Office Action of Sep. 11, 2015 for U.S. Appl. No. 14/500,502; 12 pages.
Final Office Action of Sep. 18, 2015 for U.S. Appl. No. 14/288,258, 17 pages.
Notice of Allowance of Sep. 18, 2015 for U.S. Appl. No. 14/244,830, 11 pages.
First Action Interview Pilot Program Pre-Interview Communication of Oct. 21, 2015 for U.S. Appl. No. 14/313,511, 3 pages.
Final Office Action of Oct. 22, 2015 for U.S. Appl. No. 13/830,719, 29 pages.
Final Office Action of Nov. 10, 2015 for U.S. Appl. No. 13/841,434; 30 pages.
Final Office Acton of Nov. 17, 2015 for U.S. Appl. No. 12/608,117, 32 pages.
Non-Final Office Action of Dec. 4, 2015 for U.S. Appl. No. 10/980,613 21 pages.
Non-Final Office Action of Dec. 24, 2015 for U.S. Appl. No. 14/317,346, 15 pages.
Notice of Allowance of Dec. 30, 2015 for U.S. Appl. No. 14/322,736, 9 pages.

* cited by examiner

Click on Digital Cameras element

102

Click on middle camera DSCP10 — 121

Click on Add to your cart

Click on Free Shipping element

Click on Sony Clie element

Click on Express Checkout (5% off) element

112

Click on "checkout" button

SYSTEM AND METHOD FOR DESIGN AND DYNAMIC GENERATION OF A WEB PAGE

CROSS-REFERENCE TO RELATED APPLICATIONS

This application claims priority to U.S. Provisional Application No. 60/716,535, filed Sep. 14, 2005, entitled FOLLOW-UP ENGINE, and U.S. Provisional Patent Application No. 60/717,212, filed Sep. 15, 2005, entitled SMART BAR, both of which are hereby incorporated by reference in their entirety. This application is related to U.S. application Ser. No. 11/360,530, entitled SYSTEM AND METHOD FOR PERFORMING FOLLOW-UP BASED ON USER INTERACTIONS, filed Feb. 24, 2006, which is hereby incorporated by reference in its entirety.

FIELD OF THE INVENTION

The present invention relates to computer browsing and, more particularly, to providing a web page based on user interaction.

BACKGROUND OF THE INVENTION

Networks, such as the Internet, have become an increasingly important part of our everyday lives. Millions of people now access the Internet on a daily basis to shop for goods and services and obtain information of interest.

The web is built on a very simple, but powerful premise. Much of the material on the web is formatted in a general, uniform format called HTML (Hypertext Markup Language) or the like, and all information requests and responses conform to a similarly standard protocol. When someone accesses a server on the Web, the user's Web browser will send an information request to a Web server. The Web server will respond to the request by transmitting the desired information to the user's computer. There, the user's browser will display the received information on the user's screen.

For example, suppose an individual wishes to purchase a printer via the Internet. The individual accesses the Internet and types in a vendor's uniform resource locator (URL). The individual may then access that vendor's home page to determine whether the vendor has the product that this individual wishes to purchase.

If the individual does not know which vendors sell printers, the individual may access a web site associated with a search engine. The individual enters the generic term "printer" into the search engine to attempt to locate a vendor that sells printers. Using a search engine in this manner to locate individual web sites that offer the desired product or service often results in a list of hundreds or even thousands of "hits," where each hit may correspond to a web page that relates to the search term.

Once a user decides which web page to visit, the web page is formulated to interest the user. In particular, many web pages allow a user to customize the web pager so that each time the user visits the web page, the customized web page is presented to the user. One of the challenges of online interactions is providing customers or users with consistent online experience while using different channels such as website navigation, email, chat, bulletin boards, discussion forums, chat, and the like. For this uniform presentation, cookies are used.

Cookies are pieces of information generated by a web server and stored in the user's computer, for future access. Cookies are embedded in the http information flowing back and forth between the user's computer and the servers. Cookies allow user-side customization of web information. For example, cookies are used to personalize web search engines, to allow users to participate in WWW-wide contests, to store shopping lists of items a user has selected while browsing through a virtual shopping mall, and the like.

Essentially, cookies make use of user-specific information transmitted by the web server onto the user's computer so that the information might be available for later access by itself or other servers. Typically, the servers are part of the same domain. In most cases, not only does the storage of personal information into a cookie go unnoticed, so does access to it. Web servers automatically gain access to relevant cookies whenever the user establishes a connection to them, usually in the form of web requests.

There are many reasons a given site would wish to use cookies. These range from the ability to personalize information, help with on-line sales/services, or simply for the purposes of collecting demographic information. Cookies also provide programmers with a quick and convenient means of keeping site content fresh and relevant to the user's interests. The newest servers use cookies to help with back-end interaction as well, which can improve the utility of a site by being able to securely store any personal data that the user has shared with a site to help with quick logins, and the like.

Prior dynamically generated web sites, based on cookie customization, allow users and content providers to customize content. However, while these pages are dynamically generated based on a cookie, or hard coding scenarios in the web page or server. There is no flexibility to change the web page. Further, control of the web page is with the programmer, not a marketing group.

SUMMARY OF THE INVENTION

The present invention provides a system and method to dynamically alter web pages based on a user's activity, marketing objectives, and predetermined conditions. There are two major modules in the disclosed system:
1. SmartBar™ tool; and
2. Business rule engine.

The first component is the SmartBar™ tool. The SmartBar™ is an online marketing tool that provides a point of reference on the web page for information and communication that is relevant to the specific viewer. In a preferred embodiment, the SmartBar™ is placed at the same location on each web page for a given site. A SmartBar™ or frame is provided containing at least one SmartBar™ cells. Each SmartBar™ cell is associated with a particular marketing objective. For the visitor on the site, it delivers a guided and personalized online experience with relevant and timely content. In one embodiment, Smart Bar™ modifies web pages to be viewed based in part on the items a user selects as well as the time a user spends on a specific page. Additionally, past browsing experiences can be considered. Smart Bar™ dynamically selects cell content for a web page and dynamically renders each cell, or selects cells, or alternatively, dynamically generates content for a web page. One goal of the Smart Bar™ is to enhance the browsing experience and minimize shopping cart abandonment.

The second component is the business rules engine that processes, in real-time, the events associated with each viewer and decides what business action is required. Business intelligence in the rules engine identifies what content is displayed in the SmartBar™.

In one embodiment, Smart Bar™ is used to develop marketing campaigns. Rules consist of conditions and their associated action or actions. Rules are preferably organized by campaign. Rules are used to determine what content should be displayed. The system can display promotional material, help icons, chat icons, sale items, other potentially interesting links based on activity, and the like. Each rule is assigned a priority. Thus, if more than one rule is triggered by a user's activity or browsing behavior, the rule priority determines which rule is triggered first and if other rules are subsequently triggered.

The business rules engine processes, in real-time, events associated with each visitor, and decides what rule is required. In one embodiment, the rules engine identifies whether a current visitor is a returning customer or a new customer and initiates the appropriate outcome or outcomes.

Each campaign can be broken down into segments. Each segment is adapted to deal with a specific event or type of user. This speeds the customization process and enables marketers to quickly develop campaigns.

SmartBar™ users can generate and save rules for use in other campaigns. In one embodiment, rules are stored in a database. These rules are then selected and customized, if necessary, for a campaign. The same rule can be used in multiple campaigns. Each campaign can be considered a container to group rules.

SmartBar™ enhances a web site visitor's satisfaction with a site layout and assists performance of a specific task. If a user's activity is indicative of a problem, a frame can be loaded with instructions detailing how to complete a task. Alternatively, a help icon or chat icon for customer service can be loaded. In this manner, a user's web site experience is enhanced. For example, if a user's activity indicates problems with checkout, a frame will appear to guide the user through the checkout process, thereby avoiding shopping cart abandonment and lost sales.

In one embodiment, SmartBar™ can deliver directed advertising in the form of services or products to a visitor. The advertising will change as the user navigates the web site. In one embodiment, content is presented to a user based on the visitor's browsing history.

The SmartBar™ provides a structure for managing multiple marketing messages in real time. The SmartBar™ enables the marketer to define SmartBar™ Cells, each cell dedicated to deliver different type of marketing messages. The SmartBar™ tool provides a user interface to configure content for the SmartBar™ cells. The SmartBar™ serves as a valuable medium to deliver targeted promotions, relevant content and proactive communications. Offering a combination of audience-specific navigation aids and relevant information, the SmartBar™ employs dynamically generated content that actively guides visitors through the site, so the marketer can truly replicate the in-store experience in an online environment. An improved user experience yields improved conversion rates, increase customer satisfaction, and promote brand loyalty by delivering an unmatched experience on the website. For example, in a typical SmartBar™, one cell may deliver product promotions, a second cell may deliver product comparison information, and a third cell may deliver a button for live-chat with the call center.

This intelligent and proactive technology tracks customer behavior to accurately identify and reach audience segments most likely to respond to personalized offers. SmartBar™ dynamically embeds content seamlessly into a webpage.

The combination of these two components allows for an effective handling of large volumes of interactions required in today's online environment. The disclosed system and method addresses the challenge presented to website managers who are interested in modifying, in real time, a current session of customers on the site.

BRIEF DESCRIPTION OF THE FIGURES

FIGS. 4A-4E represent typical screens for creating rules and SmartBar cell content.

DETAILED DESCRIPTION

Figure 1:
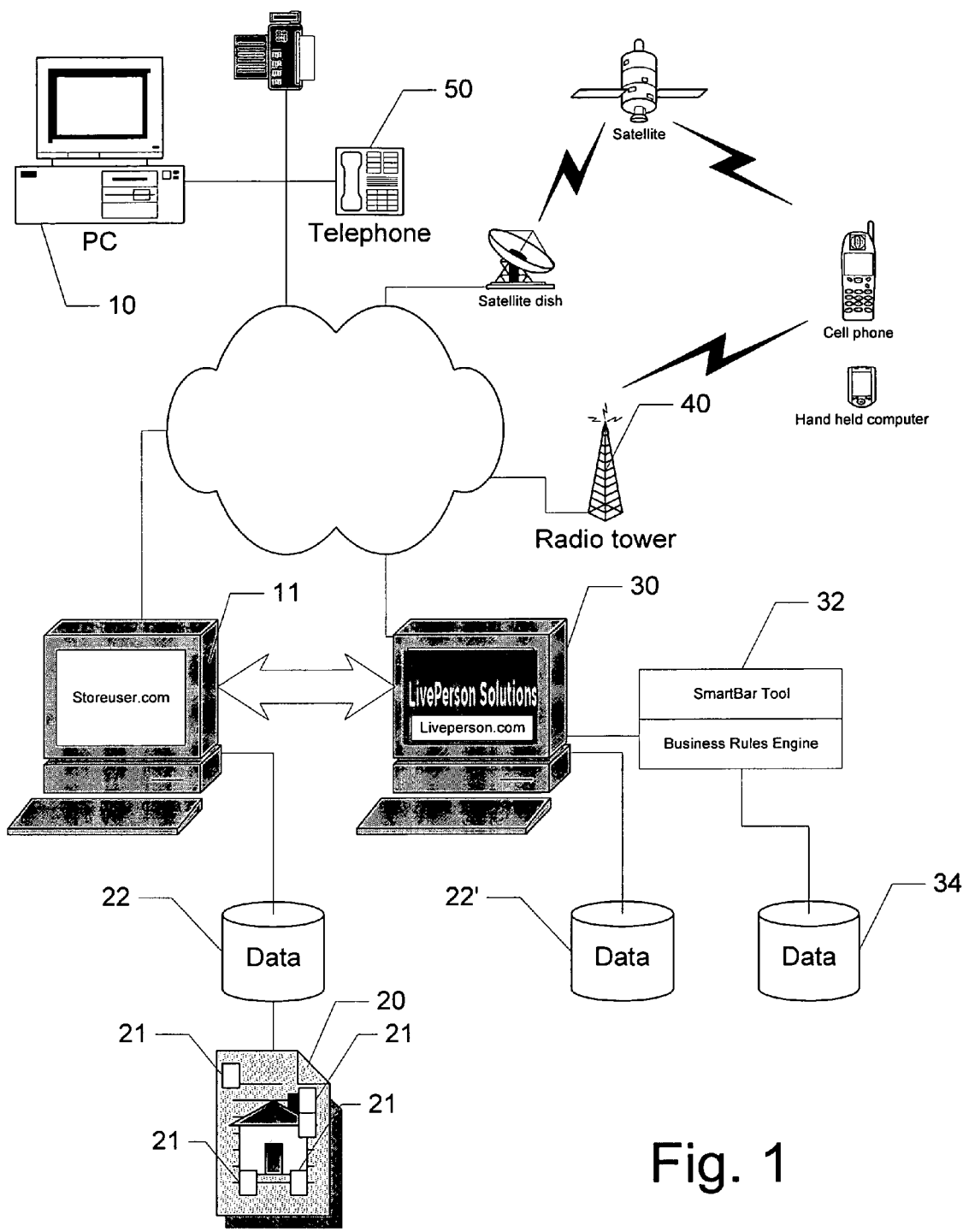
FIG. 1 System according to the present invention.

FIG. 1 depicts an embodiment of a system according to the present invention. As shown, a user 10 is connected to a web server 11 via the Internet. The user 10 has additional means of communication such as a telephone 50, fax machine, cell phone, hand held computer, and the like. In one embodiment, radio communication is implemented via radio tower 40. The web server 11 includes a database 22, which stores a plurality of web pages such as web page 20. In one embodiment, a second server 30 includes a module 32 for the application of business rules and dynamic web page generation or SmartBar™ cell population. In one embodiment, module 32 is part of server 30. In another embodiment, module 32 is part of web server 11. In another embodiment, module 32 is housed in another computer. Module 32 accesses data from database 34. Business rules are preferably stored in database 34. It should be noted that the functions of module 32 can be performed using separate modules.

There are at least three configurations for SmartBar™ system. In the first embodiment, the web site content and the SmartBar™ system are housed on a single server or linked servers. The user requests a web page containing SmartBar™ content and the web page and SmartBar™ content is provided by a single server. In the second embodiment, a first web server retrieves SmartBar™ content from a second server and provides the content to a user. In the third preferred embodiment, a user requests a web page containing SmartBar™ content from a server. The SmartBar™ content has scripts that retrieve content from a SmartBar™ server.

In operation, a user 10 requests a web page 20 from server 11. Web server 11 retrieves web page 20 from database 22. The web server, or other computer, in conjunction with server 30 and module 32, populates areas 21 in web page 20. Areas 21 are populated based in part on business rules. It should be noted that areas 21 are not fixed for every page but can vary in position and size depending on page layout. In another embodiment, areas 21 are overlays or pop-ups. In one embodiment, module 32 also hosts the content for areas 21. In another embodiment, database 22' hosts the content for areas 21. Preferably, web page 20 includes embedded code that defines each area 21. These areas 21 are populated based on the embedded code, the user's activity, and the application of business rules. In a preferred embodiment, module 32 includes a business rules engine and a SmartBar™ tool. In another embodiment, the business rules engine and the SmartBar™ tool are separate modules.

The areas 21, the SmartBar™ frame, are populated using elements retrieved from a database based in part on business rules. Preferably, server 30, and more particularly database 34, provides pointers to database 22 where the content is stored. The SmartBar™ tool modifies the user's experience via such items as chat, pop-ups, displays, cell content, clickable images, and the like, modify the user experience. The code is embedded on the page 20 at the desired location 21 chosen by the marketer, web designer, alike, possibly using an include file statement. It should be noted that the system can preferably push additional items to overlay or populate a new window such as a pop-up or chat channel. Overlays float over a page and pop-ups are new windows. The code issues real-time request asking the server for dynamic content that best match this visitor at this time. Each of these request triggers a sequence of business rule evaluations that are associated with the particular web page. These business rules determine the actual content to be displayed in each of the cells 21. The way the cells 21 are displayed to the visitor is de-coupled from the cell definition and from the rules that determine the content of the cells. The component that controls the display, or look & feel, of the SmartBar™ cell 21 is the SmartBar™ Template. The user can define SmartBar™ templates in the Content Library. The template may contain any web-page code (e.g. HTML, DHTML, or ASP).

Figure 2:
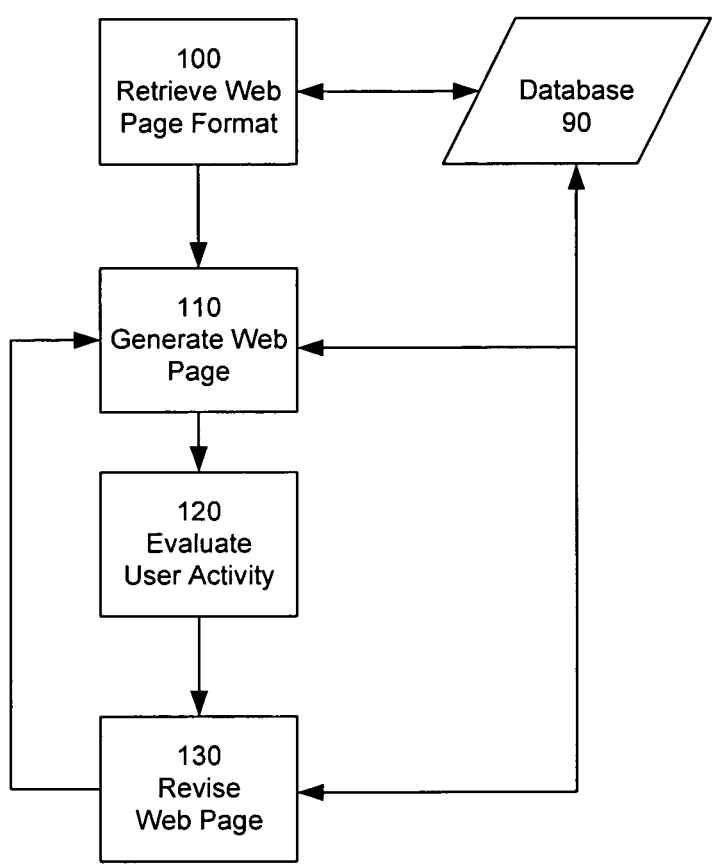
FIG. 2 is a flowchart of the method of user interaction according to the present invention.

As shown in FIG. 2, the process begins when a user requests a web page. The system retrieves a web page format for the requested page. (Step 100). In one embodiment, the web page format is retrieved from database 90. The system then generates the web page including any SmartBar™ cells 21. (Step 110). The content of the SmartBar™ calls is determined based on user activity and business rules. If there has not yet been any user interaction, business rules and embedded code determine the content of SmartBar™ cells 21.

Once the web page 20 is generated, the user's activity on that page, and subsequently viewed pages, is monitored and evaluated. (Step 120). The user's activity includes time spent on a particular page, additional data requests, adding items to a cart, and the like. The system revises the web page being displayed (Step 130) based on the user's activity or alternatively generates a new page based on the activity (Step 110).

The business rule engine processes, in real-time, the events associated with each user and decides what action to take, if any. If the business rule engine determines a need, action is taken in real-time. If no immediate action has to be taken, a non-modified web page is displayed. Specific actions to take include special offers, invitations to chat, help icons, related products, related material, displaying pop-ups, clickable images, and the like.

The business rules engine uses rules that are based on conditions and actions taken while a user is visiting a specified website or series of web pages. Certain conditions will result in specific actions being taken. The conditions include both the activities that a user that performs while on a site and the user's behavior while on a page, and if available, the past activity, IP address, search activity, and the like. Rules provide a way to react to customer activity. Visitor rules also customize the processing of visitors and/or people communicating via chat or another channel. In a preferred embodiment, rules are created within a specific context that determines the circumstances in which the rule will apply. The rules respond to conditions that exist. Conditions specify which actions are triggered. If no conditions are specified, the rule is triggered in response to all activity. It should be noted that multiple conditions can be specified or Boolean logic can be used.

Each rule can control multiple cells, and multiple rules can affect a single cell. The rules control the displayed content. Under certain circumstances, a cell may not display any content. Marketers or others define the content of the cells. Web designers place calls for SmartBars™ and SmartBar™ cell content. The management of the page is done using a template. The template for a SmartBar™ is preferably stored in a content library, not on a web page.

Rules allow the web site to react to visitor activity on the website. Visitor Rules customize the processing of website visitors; they are used to create custom business rules that trigger related actions such as chat invitations, promotional offers, marketing campaigns, and the like. Rules are preferably created with a specific rule context or Rule Type that determines the circumstances in which the rule will apply. For example, a rule that is set for "when a visitor enters site" will be triggered for processing each time a visitor enters the site. When the user visits the site, the conditions specified by the rule will be checked and if found true, the actions specified in the rule will be performed by the system.

TABLE 1

| Visitor Rules - Conditions | | |
|---|---|---|
| Condition | Rule type | Description |
| Browsing | | |
| Current Page | clicks to chat<br>enters page<br>enters site<br>queued for chat<br>leaves site | The URL or title of the current page match the specified pattern. |
| Current Page Referring URL | clicks to chat<br>enters page<br>enters site<br>queued for chat<br>leaves site | The referring URL of the current page match the specified pattern. |

TABLE 1-continued

Visitor Rules - Conditions

| Condition | Rule type | Description |
|---|---|---|
| Number of Pages | clicks to chat<br>enters page<br>enters site<br>queued for chat<br>leaves site | The number of pages visited during this session. |
| Referring URL | clicks to chat<br>enters page<br>enters site<br>queued for chat<br>leaves site | Matches the referrer of the visitor's first visit to the site. |
| Search Engine Found | clicks to chat<br>enters page<br>enters site<br>queued for chat<br>leaves site | The URL from which the visitor arrived is from a search engine. |
| Search Engine Identity | clicks to chat<br>enters page<br>enters site<br>queued for chat<br>leaves site | The search engine from which the request came. |
| Survey Question | clicks to chat<br>enters page<br>enters site<br>queued for chat<br>leaves site | Response to a question in a particular survey. |
| Visited Page | clicks to chat<br>enters page<br>enters site<br>queued for chat<br>leaves site | The visitor visited a page whose URL or title matches the specified pattern. |

Chat

| Condition | Rule type | Description |
|---|---|---|
| Available for Invitation | clicks to chat<br>enters page<br>enters site<br>queued for chat<br>leaves site | Visitor is available for a chat invitation. |
| Has Chat | clicks to chat<br>enters page<br>enters site<br>queued for chat<br>leaves site | Visitor has chatted during the current session. |
| Has Chat History | clicks to chat<br>enters page<br>enters site<br>queued for chat<br>leaves site | The visitor requested to chat in a previous visit. |
| In Chat | clicks to chat<br>enters page<br>enters site<br>queued for chat<br>leaves site | The visitor is currently involved in a chat session with an operator. |
| In Chat or Waiting for Chat | clicks to chat<br>enters page<br>enters site<br>queued for chat<br>leaves site | The visitor is currently in a chat, or waiting for a chat to be established. |
| In or After Chat | clicks to chat<br>enters page<br>enters site<br>queued for chat<br>leaves site | The visitor is currently in a chat, or has previously been in chat |

TABLE 1-continued

| Visitor Rules - Conditions | | |
|---|---|---|
| Condition | Rule type | Description |
| Invited to Chat | clicks to chat<br>enters page<br>enters site<br>queued for chat<br>leaves site | The visitor has been invited to chat. |
| Refused Chat | clicks to chat<br>enters page<br>enters site<br>queued for chat<br>leaves site | An invitation to chat been has sent to the visitor and the visitor refused to chat. |
| Miscellaneous | | |
| Action Fired | clicks to chat<br>enters page<br>enters site<br>queued for chat<br>leaves site | The action with the specified name has already fired during this session. |
| At Least One Rule Triggered | clicks to chat<br>enters page<br>enters site<br>queued for chat<br>leaves site | The rule with the specified name has already been triggered during this session. |
| Predictive Dialer | enters page<br>enters site | Triggers a predictive dialer with the specified settings. A Predictive Dialer controls the number of invitations sent to site visitors. |
| Random Number | clicks to chat<br>enters page<br>enters site<br>queued for chat<br>leaves site | A random integer between 0 and the specified number. |
| Rule Triggered | clicks to chat<br>enters page<br>enters site<br>queued for chat<br>leaves site | The outcome with the specified rule has already been triggered during this session. |
| Operators | | |
| Available Operators | clicks to chat<br>enters site<br>leaves site | At least one operator is online. (i.e., is the operator in the "online" state, not "away" or "back in 5"). |
| Number of Operators Available | clicks to chat<br>enters site<br>leaves site | The Number of available operators available. |
| Online Operators | clicks to chat<br>enters site<br>leaves site | Operators are currently in the "online" state. An operator that is "away" or "back in 5" is not considered online. |
| Room Operators Online | clicks to chat<br>enters site<br>leaves site | There is at least one operator of the skill specified online in the current visitor's Room. |
| Skill Operators Available | clicks to chat<br>enters page<br>enters site<br>queued for chat<br>leaves site | There is at least one operator of the specified skill available. |
| Skill Operators Online | clicks to chat<br>enters site<br>leaves site | There is at least one operator of the specified skill online. |
| Time Functions | | |
| Day of the Week | clicks to chat<br>enters page<br>enters site<br>queued for chat<br>leaves site | The day of the week. |

TABLE 1-continued

Visitor Rules - Conditions

| Condition | Rule type | Description |
| --- | --- | --- |
| Days Since Last Click-to-Chat | clicks to chat<br>enters page<br>enters site<br>queued for chat<br>leaves site | The number of days since the last time this visitor has requested to chat. |
| Days Since Last Visit | clicks to chat<br>enters page<br>enters site<br>queued for chat<br>leaves site | The number of days since the visitor's last visit to the site (fails if this is the first visit). |
| Invitation History (cross session) | clicks to chat<br>enters page<br>enters site<br>queued for chat<br>leaves site | The number of seconds for the visitor to be invited to chat. This condition also checks the visitor's previous sessions. To check chat invitations only in the current session use "Invited to Chat" or "Time Since Last Invite" |
| Invitation Timeout | clicks to chat<br>enters page<br>enters site<br>queued for chat<br>leaves site | The number of seconds the Invitation to chat timed out. If the last invitation did not timeout, the condition will always be false. |
| Seconds in Current Page | clicks to chat<br>enters page<br>enters site<br>queued for chat<br>leaves site | The number of seconds the visitor was on the current page. |
| Seconds Since Decline | clicks to chat<br>enters page<br>enters site<br>queued for chat<br>leaves site | The number of seconds since the visitor was declined. |
| Seconds Since Last Visit to Page | clicks to chat<br>enters page<br>enters site<br>queued for chat<br>leaves site | The number of seconds since the visitor last visited a page that matches the specified pattern. |
| Time In Site | clicks to chat<br>enters page<br>enters site<br>queued for chat<br>leaves site | The time in seconds that the visitor spent in the site during this session. |
| Time of the Day | clicks to chat<br>enters page<br>enters site<br>queued for chat<br>leaves site | The number of minutes elapsed since midnight, Eastern Standard Time, today. |
| Time Since Action Fired | clicks to chat<br>enters page<br>enters site<br>queued for chat<br>leaves site | The time in seconds since the specified action fired. |
| Time Since Custom Variable Modified | clicks to chat<br>enters page<br>enters site<br>queued for chat<br>leaves site | The time in seconds since the custom variable was modified. |
| Time Since Last Invite | clicks to chat<br>enters page<br>enters site<br>queued for chat<br>leaves site | The time in seconds since the visitor's last invite. |

TABLE 1-continued

Visitor Rules - Conditions

| Condition | Rule type | Description |
|---|---|---|
| Time Since Rule Fired | clicks to chat<br>enters page<br>enters site<br>queued for chat<br>leaves site | The time in seconds since the rule fired. |
| Wait Time | clicks to chat<br>enters page<br>enters site<br>queued for chat<br>leaves site | The time in seconds that the visitor has been in the queue. |
| Variables | | |
| All Values of Custom Variable | clicks to chat<br>enters page<br>enters site<br>queued for chat<br>leaves site | Apply the comparison to All values of the specified Custom Variable. All values must be Numeric and satisfy the comparison condition. |
| At Least One Numeric Value of Custom Variable | clicks to chat<br>enters page<br>enters site<br>queued for chat<br>leaves site | The Custom Variable has at least one value that satisfies the comparison condition. Enter custom variable name in the first field, and number to match in the last field. |
| At Least One Value of Custom Variable | clicks to chat<br>enters page<br>enters site<br>queued for chat<br>leaves site | The Custom Variable has at least one value that satisfies the comparison condition. Enter custom variable name in the first field, and string to match in the last field. |
| Custom Flag Variable | clicks to chat<br>enters page<br>enters site<br>queued for chat<br>leaves site | The custom flag variable satisfies the comparison condition. |
| Custom Variable | clicks to chat<br>enters page<br>enters site<br>queued for chat<br>leaves site | The value of the Custom Variable that corresponds to the specified name |
| Custom Variable Has Been Set | clicks to chat<br>enters page<br>enters site<br>queued for chat<br>leaves site | A Custom Variable with the specified name has been set. |
| Custom Variable on Current Page | clicks to chat<br>enters page<br>enters site<br>queued for chat<br>leaves site | There is a Custom Variable on the current page. |
| Numeric Custom Variable | clicks to chat<br>enters page<br>enters site<br>queued for chat<br>leaves site | Apply the comparison to All values of the specified Custom Variable. All values must be Numeric and satisfy the comparison condition. |
| Numeric Values of Custom Variable | clicks to chat<br>enters page<br>enters site<br>queued for chat<br>leaves site | The numeric value of the Custom Variable with the specified name (fails if Custom Variable has not occurred or the value is not numeric). Enter Custom Variable name in the first field, and number to match in the last field. |
| Visitor Properties | | |
| Browser Type (User Agent) | clicks to chat<br>enters page<br>enters site<br>queued for chat<br>leaves site | The visitor's browser matches the specified pattern. |

TABLE 1-continued

Visitor Rules - Conditions

| Condition | Rule type | Description |
|---|---|---|
| Hot Lead | clicks to chat<br>enters page<br>enters site<br>queued for chat | Visitor is specified as a hot lead. |
| IP | clicks to chat<br>enters page<br>enters site<br>queued for chat<br>leaves site | The visitor's IP address or host-DNS matches the specified pattern. |
| Repeat Visit | clicks to chat<br>enters page<br>enters site<br>queued for chat<br>leaves site | This visitor has been to the site before this session. |
| Skill | clicks to chat<br>enters page<br>enters site<br>queued for chat<br>leaves site | The visitor's skill group. |
| Visitor Group | clicks to chat<br>enters page<br>enters site<br>queued for chat<br>leaves site | The group number for this visitor, if all visitors are grouped into groups. The site visitors are randomly segmented into the number of groups you set in the 3rd parameter. You can then check to which specific group the visitor has been assigned. |

Conditions may include the type of page, section of a page or a specific URL. Additionally, if the user reaches a page via a hyperlink or by typing a URL, that scenario can be monitored without taking any action. The time a user spends on a specific page may also be a condition. For example, the system can monitor whether a user spends more or less than a specified time on a page or group of pages. Conditions relate to events that occur as well as events that do not occur. For example, adding items to a cart but not checking out.

Rule conditions can also apply to variables. Rule actions can set the value of a variable to a predetermined value. For example, the value or occurrence may be a shopping cart total greater than a specified dollar amount or contain more or less than a specified amount/quantity. Further, other variables can indicate a transaction error (a Boolean variable). The system can also monitor at least such items as an occurrence of a specified event, entering a communication channel such as chat before or after a selection, days since last chat interaction, and the like. Further, other variables can be a new visitor, old visitor, user's IP address, and the like.

As discussed above, when certain conditions occur, an action is triggered. Actions may contain sub-actions. In one embodiment, the actions are executed in a specific order. However, in another embodiment, the actions occur in random or non-specified order. A sample of actions based on rules and alerts are shown below in Table 2.

TABLE 2

Visitor Rules - Actions

| Type | Rule Type | Action | Parameters | Description |
|---|---|---|---|---|
| Operator Alerts | clicks to chat<br>enters page<br>enters site<br>queued for chat<br>leaves site<br>browsing site | Operator Alert | | Send an alert to operators concerning this visitor. For a list of macros available in Operator Alerts, refer to the Live Person Customer Center. |
| | | | Description | Enter a brief description of the operator alert, if you so wish. |
| | | | HTML | Use the HTML box to design your alert. Plain text can be used in this area, but HTML tagging will serve to make the alert more eye-catching. |
| Chat Audit | clicks to chat<br>enters site<br>leaves site | Email this transcript | Email<br>Sender Name<br>Sender Email<br>Subject | Email a copy of the chat transcript to the specified address. The email will arrive from the specified sender. Set the subject to help you identify the email. |
| | | Forward transcript from visitor email | Email<br>Subject<br>Email Custom Variable | Email a copy of the chat transcript to the specified address. The email will arrive from the email associated with the visitor. You can optionally set the custom variable to be used to extract the visitor's email address (Email Custom Variable). |

TABLE 2-continued

Visitor Rules - Actions

| Type | Rule Type | Action | Parameters | Description |
|---|---|---|---|---|
| Visitor Experience | clicks to chat enters page enters site leaves site browsing site | Engage Visitor | NA | Send a proactive chat request to a visitor. |
| | | Custom Engage Visitor | <custom directory> | Engage visitor using custom image directory. The directory should not end with a "/". |
| | | Set Visitor Profile | <name of visitor profile> | Assign the session to a selected Visitor Profile. |
| | | Enable/Disable Pre-Chat Survey | Pre-Chat Survey | Enable/Disable Pre-Chat survey status for the visitor during current session. |
| | | Enable/Disable Exit Survey | Exit Survey | Enable/Disable the Exit survey status for the visitor during current session. |
| | | Enable/Disable Operator Survey | Operator Survey | Enable/Disable the Operator survey status for the visitor during current session. |
| | | Set Pre-Chat survey | <name of pre-chat survey> | Set specific Pre-Chat survey for the visitor during current session. |
| | | Set Exit survey | <name of exit survey> | Set specific Exit survey for visitor during current session. |
| | | Set Operator survey | <name of operator survey> | Set specific Operator survey for visitor during current session. |
| | | Set Offline survey | <name of offline survey> | Set specific Offline survey for the visitor during current session. |
| | | Set Chat Window | <name of chat window> | Set a specific Chat Window profile for the visitor during current session. |
| | | Set System Messages | <name of system message set> | Set specific System Messages set for the visitor during the current session. |
| | enters page | Show Popup | <popup> | Display a pop-up. New pop-ups are created in the Content Library. |
| | enters page | Engage Visitor | NA | Send a proactive chat request to a visitor. |
| | enters page | Custom Engage Visitor | <custom directory> | Engage visitor using custom image directory. The directory should not end with a "/". |
| | enters page | Show Warm-up | <popup> | Use the Content Library tab to define new warm-ups. |
| Variables | clicks to chat enters page | Set Custom Variable | Variable Name Variable Value | Add a custom variable to the session. |
| | enters site queued for chat | Set Custom Flag Variable | Flag Name State On <HelvBold> | Off | Add an on/off custom variable to the session. |
| | leaves site browsing site | Set Custom Variable - One Time Only | Variable name Variable Vale | Add a custom variable to the session. This action will only fire once per session. |
| Routing | queued for chat | Assign to Service Queue | <Service Queue> | Change the visitor's service queue. |
| | | Assign Percentage to Service Queue | <Service Queue> | Assign a percentage of visitors to a queue. Use several of these outcomes together to create a distribution plan for a group of visitors. Note that visitors will only be assigned if the queue is online for the Skill Group. |
| Sales Edition | click to chat enters site | Set Visitor as Hot Lead | NA | Visitor is defined as a hot lead. |
| | queued for chat browsing site | Increment Reporting Counter | <file location> | Include specified words that can be viewed in the Conversion reports. Counters are defined in Rules > Words > Report Counters. |
| | | Set Visitor Segment | <segment name> | Set the visitor Segment |

Figure 3A:
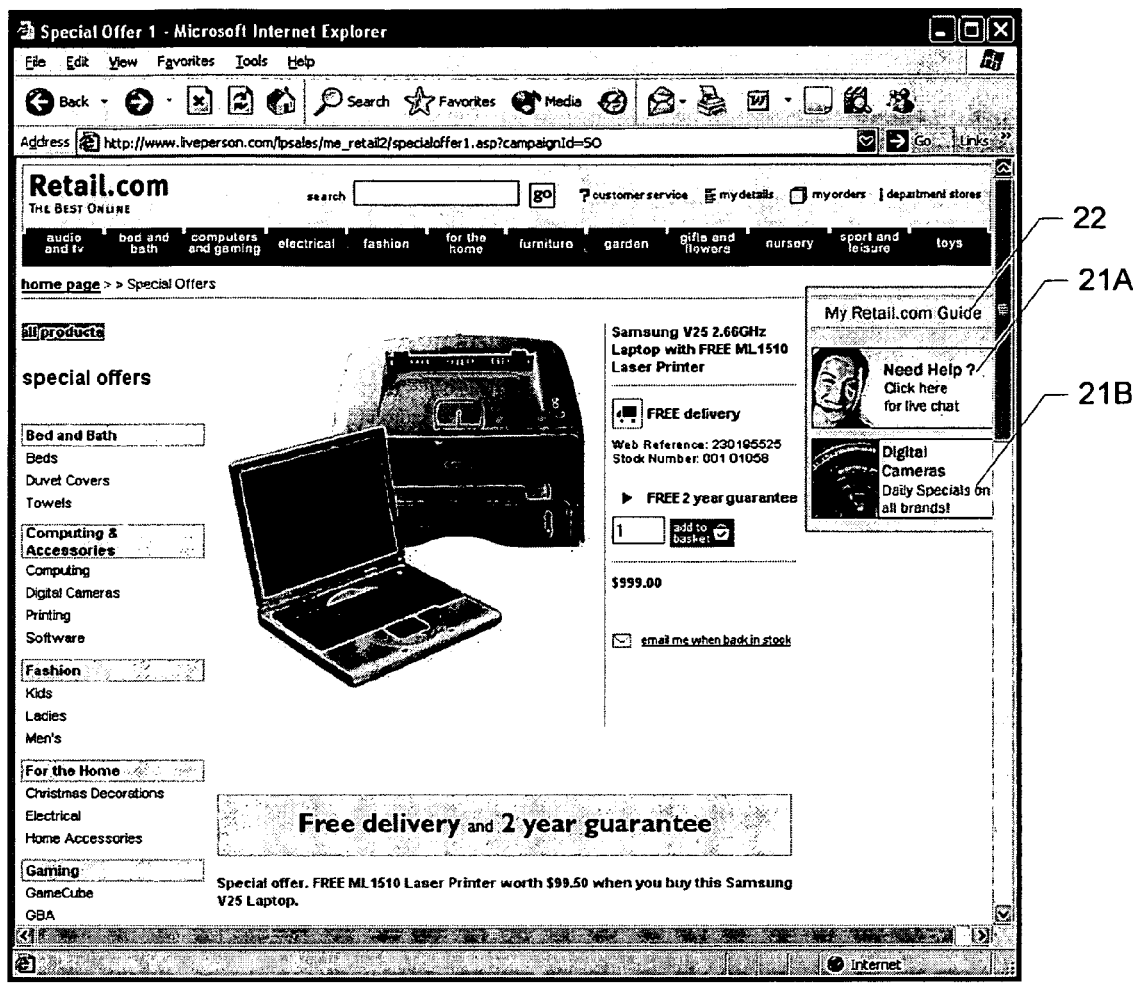
FIGS. 3A-3H represent screen shots of a typical user interaction on a web site.
Figure 3B:

FIGS. 3A-3H depict a typical user's interaction on a series of web pages for a given web site. FIG. 3A depicts a single page for a web site, retail.com. As shown, the SmartBar™ cells 21A and 21B are on the right side of the page 100 in a SmartBar™ frame. As shown, the SmartBar™ frame includes cells 21A-21F. In this embodiment, cell 21A is a communication channel, cell 22B is a product recommendation cell, cell 21C is an incentive cell, cell 21D is an express checkout cell, cell 21E is a buying guide, and cell 21F is a post purchase cell. It should be noted that other cells could be part of a SmartBar™ frame. Other elements such as headings 22, links, images and the like can be added using SmartBar™ cells. While the SmartBar™ cells are shown together on a background. In one embodiment, they are space apart from one another. In another embodiment, the SmartBar™ cells blend into the page as uniform elements. The SmartBar™ cells as shown provide a user with means to initiate help via online chat or investigate specials. In a preferred embodiment, the SmartBar™ frame and all of its cells are on each page, however, only those cells that have had their content requested are displayed. If the user browsing page 100 clicks (selects) SmartBar™ cell 21B, the web page shown in FIG. 3B is generated.

As show in FIG. 3B, web page 102 includes SmartBar™ cells 21A, 121, and SmartBar™ 221. SmartBar™ 121 is an example of a single-cell SmartBar™. A web designer or marketer may include cell 21A on every web page for this site because it is a help button. SmartBar™ cells 221 and 121 are generated based on business rules and user activity. For example, SmartBar™ frame 221 displays various cameras and camcorders based on popularity. Additionally, it should be noted other information can be presented to the users such as shop by brand options and the like.

Figure 3C:
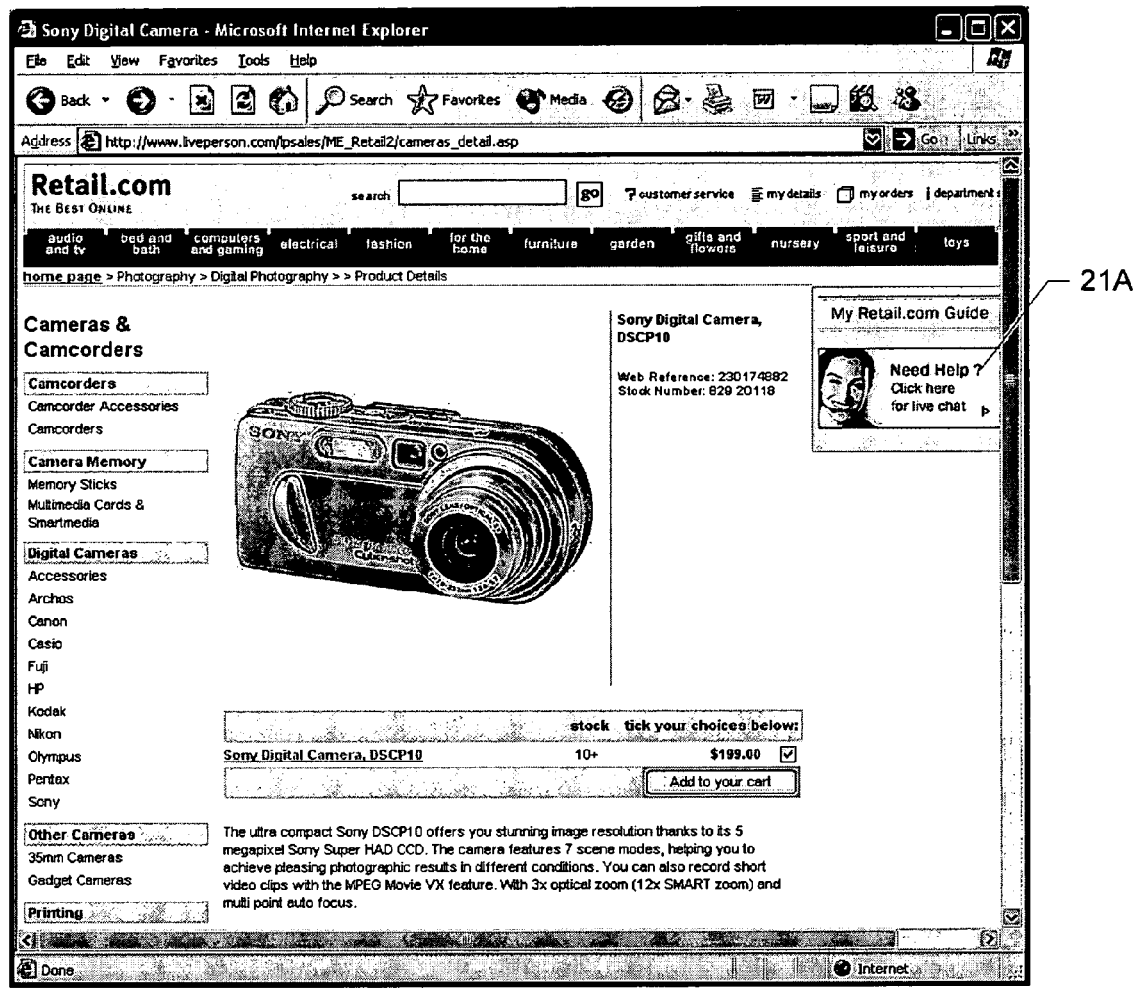
Figure 3D:
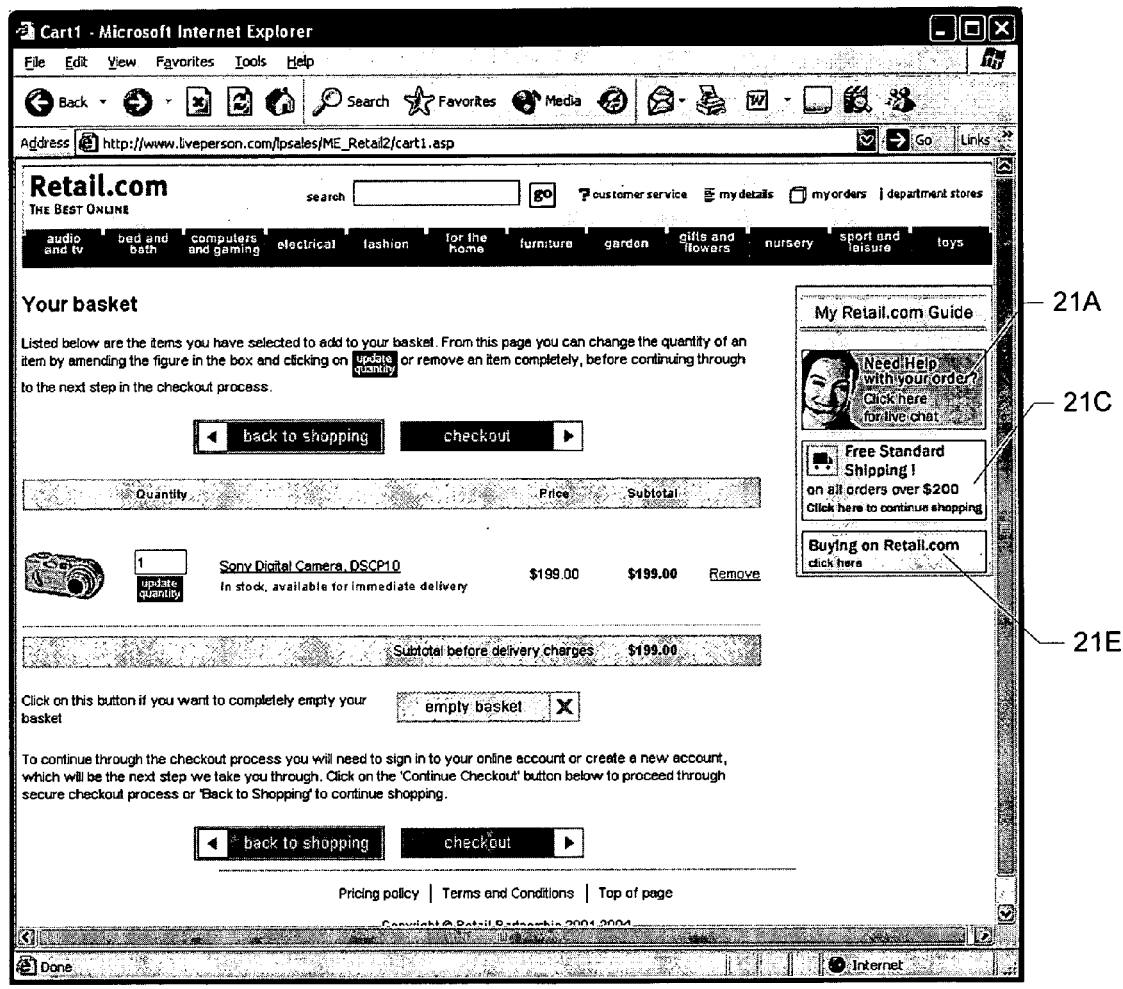

If the user selects the camera designated in SmartBar™ cell 121 the user is brought to a webpage 104 depicted in FIG. 3C. As shown in FIG. 3C only SmartBar™ cell 21A is present. Depending on the web design other SmartBar™ cells can be displayed. When the user adds the items shown in FIG. 3C to a shopping cart, a new web page 106 is displayed as well as other options in the SmartBar™ cells. As shown in FIG. 3D, other sales and marketing SmartBar™ cells can be added to the shopping cart page such as a free shipping incentive (21C) and instruction for purchasing on the website (21E). It should be noted that the free shipping or other element can be determined based on the purchase price or value of items in the visitors shopping cart.

Figure 3E:
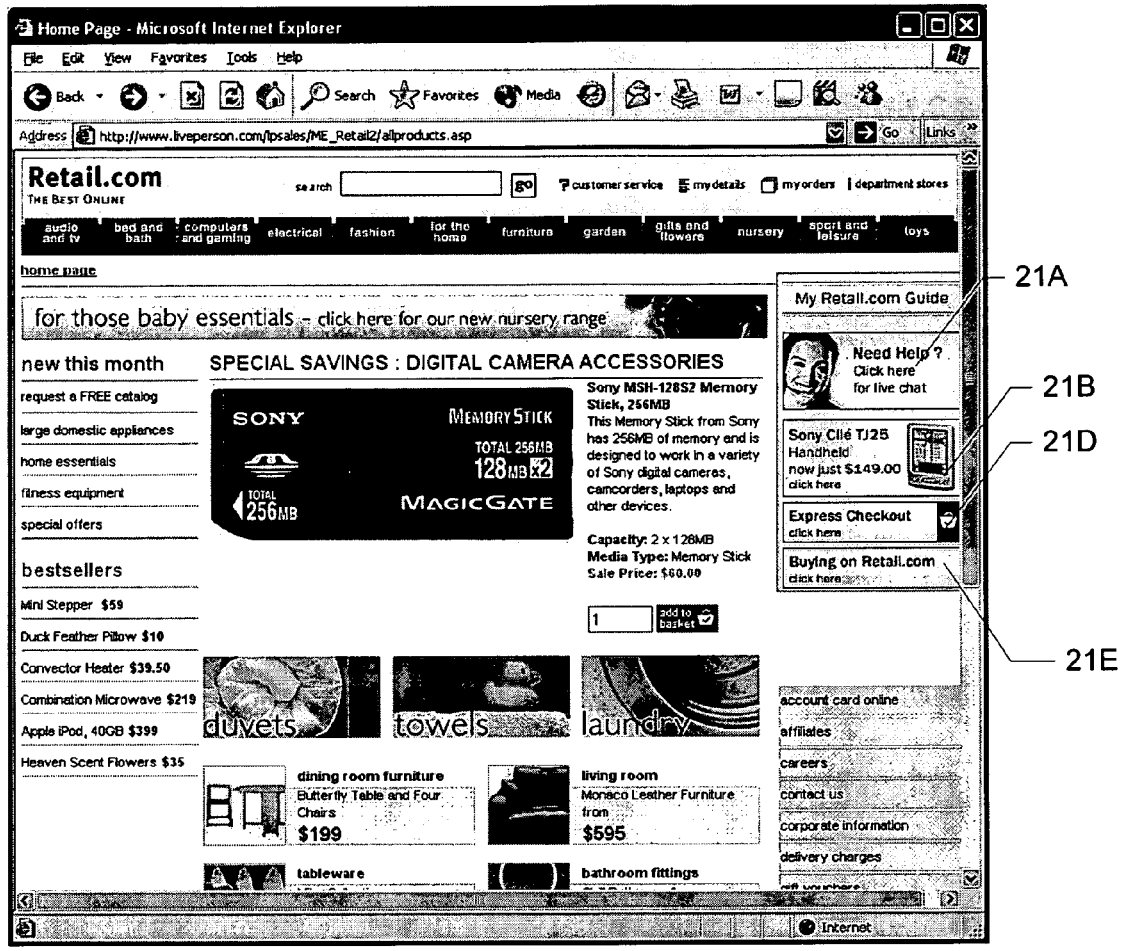
Figure 3F:
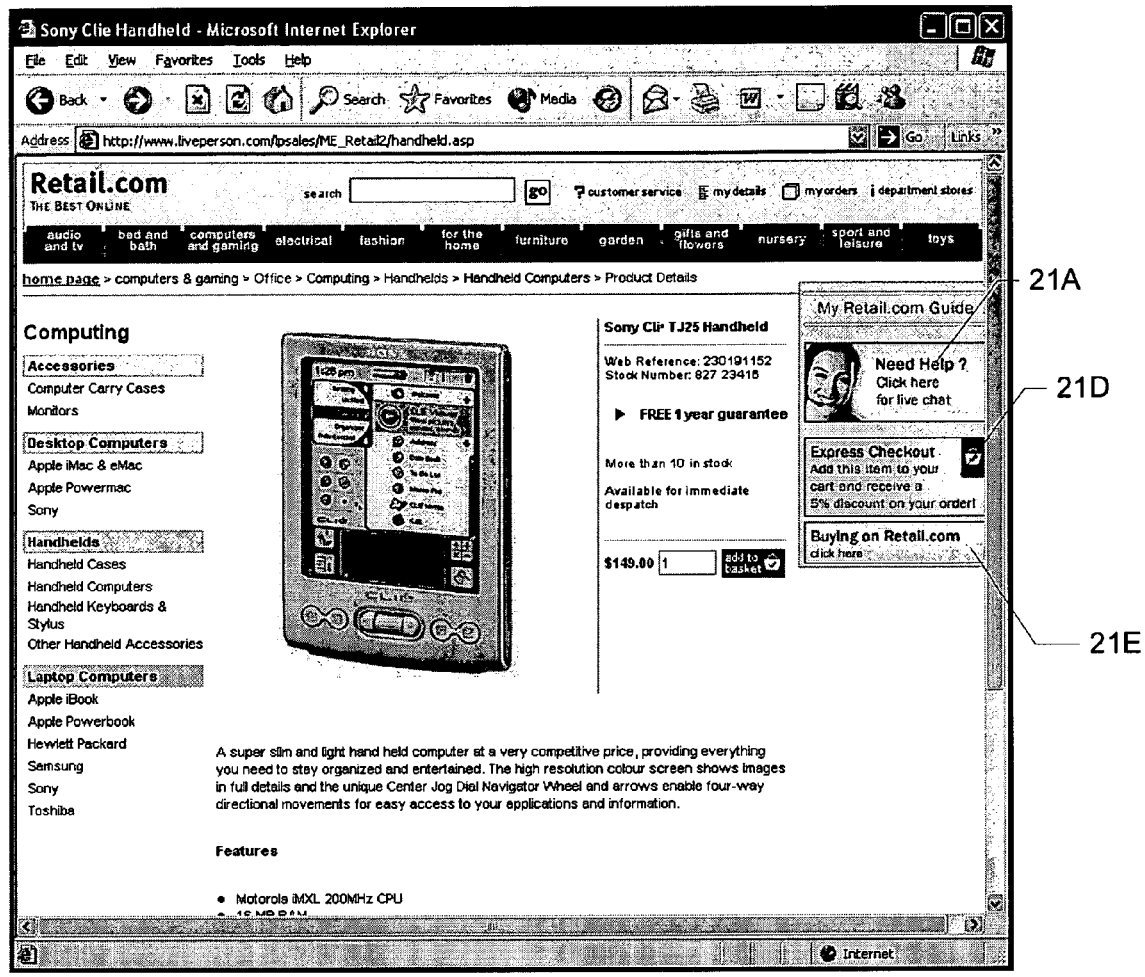

When the user selects the SmartBar™ cell 21C designating the free shipping a new screen is generated as shown in FIG. 3E. Here, the SmartBar™ cell can include other items such as other products manufactured by the same manufacturer 21B or an express checkout button 21D. Further, the item being featured in the center frame can also be managed as a dynamic-content SmartBar™ cell. It should be noted that cell 21B changes its content based on conditions present during user interaction. Based on the business rules used to generate the web pages, if the user selects the Sony item in cell 21B a new screen 110 as shown in FIG. 3F is generated. As shown, this screen 110 can include a SmartBar™ cell offering a discount if the user adds the current item to the cart. It should be noted that while a discount is shown in FIG. 3F as SmartBar™ cell 21D any offer can be implemented or information presented using SmartBar™ cells.

Figure 3G:
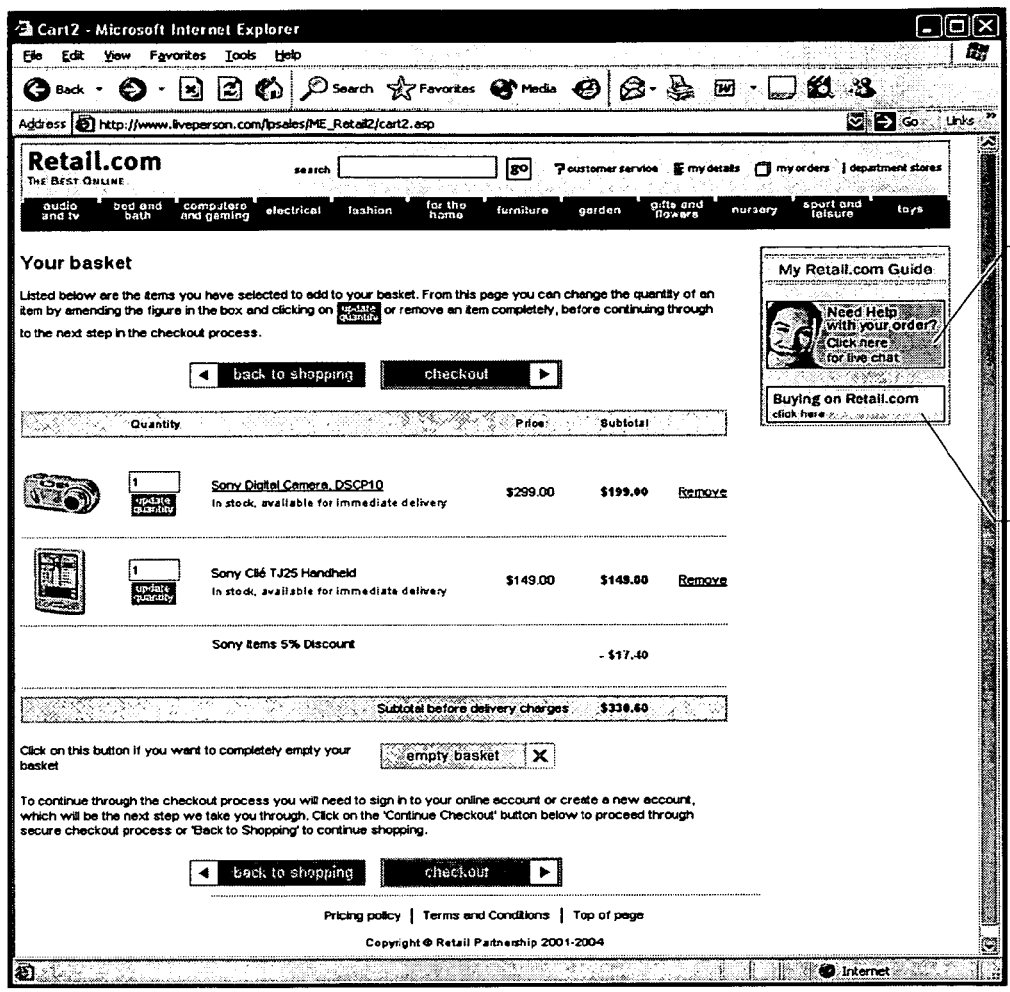
Figure 3H:
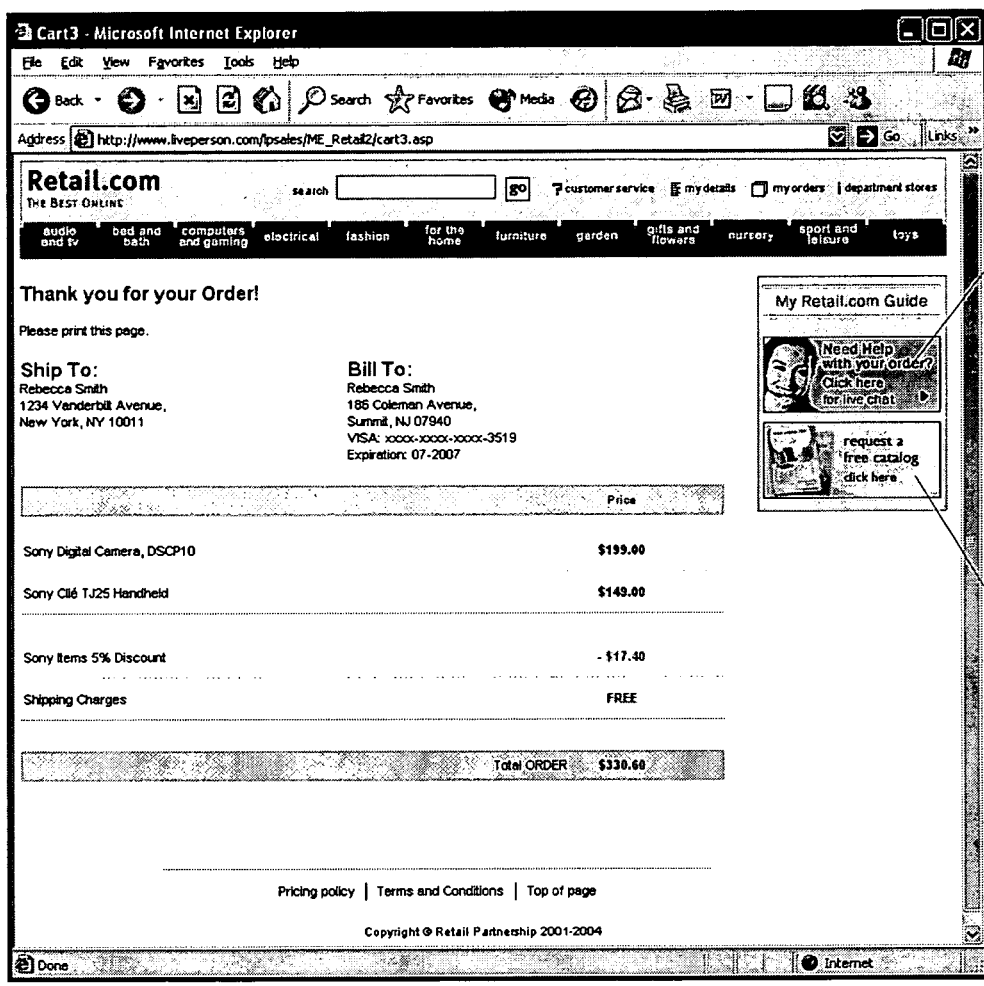

As shown in FIG. 3G, once the second item is added to the shopping cart a new basket screen is generated. This new screen reflects the discount offer. It should be noted that because the visitor already qualified for the free-shipping offer shown to the user previously, this incentive is no longer generated. Once the user checks out, she is provided with a receipt page (FIG. 3H). On this page, because the order is complete, the user is provided with an opportunity to request a catalogue (cell 21F). It should be noted that other offers can be provided to the user at any time and/or inst at any point on the screen.

In the preferred embodiment, the SmartBar™ code on the page requests its content to be rendered with respect to a specified template. The template is stored in the Content Library. This template is configured and customized by the user. Generic templates are also provided with the software.

| Sample SmartBar ™ |
|---|
| <iframe id="LPDynamicFrameSales" name="LPDynamicFrameSales" src="blank.html" width="1" height="0" frameBorder="0" marginwidth="0" marginheight="0" scrolling="no"> </iframe> <script language="javascript"> function loadLPDynamicFrameframe( ) var s = document.createElement("script"); s.src="http://sales.liveperson.net/hc/90331780/?cmd=file&file= dynamicFrame&dynamicFrame=SmartBar"+ "&frame=LPDynamicFrameSales&site=90331780"; document.body.appendChild(s); if (typeof(lpVisitorDependantCode) == "undefined") lpVisitorDependantCode = new Array( );   lpVisitorDependantCode[lpVisitorDependantCode.length] = loadLPDynamicFrameframe; </script> |

In another embodiment, the code for rendering the SmartBar™ is embedded on the web page, requesting in real-time the content to be resolved through the business rules engine. As shown below, the SmartBar™ code establishes cells on a web page. The code below includes programmed content calls. Alternatively, the code includes calls to other content. These cells are then using the business rules as discussed above. It should be noted that the placement of the cells is at the programmer's discretion for the preferred presentation and that the business rules are designed for specific marketing purposes, informational services, and the like.

| Sample SmartBar |
|---|
| <!-- Instructions:     Replace <account number> by you LivePerson account number     Replace <url path> by the complete path to the SmartBar deployment directory --> <!-- ****** Begin LivePerson SmartBar(TM) Code ***** --> <div id="lpMEguide"> <script type="text/javascript" language="JavaScript">document.getElementById("lpMEguide").style.display = 'none';</script> <table width="150" border="0" cellspacing="0" cellpadding="0" style="background-color: #eeeeee; padding: 2 4 2 4"> <tr><td align="center"><img src="http://_.gif" style="margin-bottom: 2px"> </td> </tr> <tr id="lpMEframe(LPbarCartCrossSell)TR" valign="top"> <td> <iframe name="lpMEframe(LPbarCartCrossSell)" id="lpMEframe(LPbarCartCrossSell)" marginwidth="0" marginheight="0" scrolling="no" frameborder="0" width="0" height="0"> </iframe> </td> </tr> <tr id="lpMEframe(LPbarCartCartActions)TR" valign="top"> <td> |

| Sample SmartBar |
|---|

```
<iframe name="lpMEframe(LPbarCartActions)" id="lpMEframe(LPbarCartCartActions)" marginwidth="0"
marginheight="0" scrolling="no" frameborder="0" width="0" height="0">
</iframe>
</td>
</tr>
<tr id="lpMEframe(LPbarCartBuying)TR" valign="top">
<td>
<iframe name="lpMEframe(LPbarCartBuying)" id="lpMEframe(LPbarCartBuying)" marginwidth="0" marginheight="0"
scrolling="no" frameborder="0" width="0" height="0">
</iframe>
</td>
</tr>
</table>
<script>
function lpMEloadFrameSrc(lpMEname,ctlParms)
    var lpMEframeId="lpMEframe("+lpMEname+")";
    var lpMEframeSrcUrl="http://sales.liveperson.net/hc/<account number>/cmd/url/?site=<account
number>&page="+
        escape('http://<url path>/Scripts/lpMEGenericContent.html?frame='+lpMEframeId)+
        "&info=("+lpMEname+")"+ctlParms+"&d"+(new Date( ).getTime( ));
    document.getElementById(lpMEframeId).src=lpMEframeSrcUrl;
function lpMEloadAllFrames(timeoutTrigger)
    if (timeoutTrigger)
        setTimeout("lpMEloadAllFrames(false)", 10);
        return;
    lpdbInitDynamicButtonRealtime( );
    lpMEloadFrameSrc("LPbarCartCrossSell","&waitForVisitor=false");
    lpMEloadFrameSrc("LPbarCartActions","&waitForVisitor=false");
    lpMEloadFrameSrc("LPbarCarBuying","&waitForVisitor=false");
</script>
<iframe name="lpMEwaitForVisitor" id="lpMEwaitForVisitor" scrolling="no" frameborder="0" width="0" height="0">
</iframe>
<script>
var lpMEwaitForVisitorFlag;
if (typeof(lpMEwaitForVisitorFlag)=="undefined")
    lpMEwaitForVisitorFlag=true;
document.getElementById("lpMEwaitForVisitor").src=
    "http://sales.liveperson.net/hc/<account number>/cmd/url/?site=<account number>&page= "+
    escape("http://<url path>/Scripts/lpMEloadAllFrames.html") +
    "&info=(lpMEwaitForVisitor)" +
    "&waitForVisitor="+(lpMEwaitForVisitorFlag?"redirectBack&redirectTimeout=400":"false") +
    "&d="+(new Date( ).getTime( ));
</script>
</div>
<!-- ****** End LivePerson SmartBar(TM) Code ***** -->
```

SmartBar™ cells are dynamic cells embedded in web pages. In a preferred embodiment, the HTML code embedded in the web page pulls information from a dedicated web server.

Figure 4A:
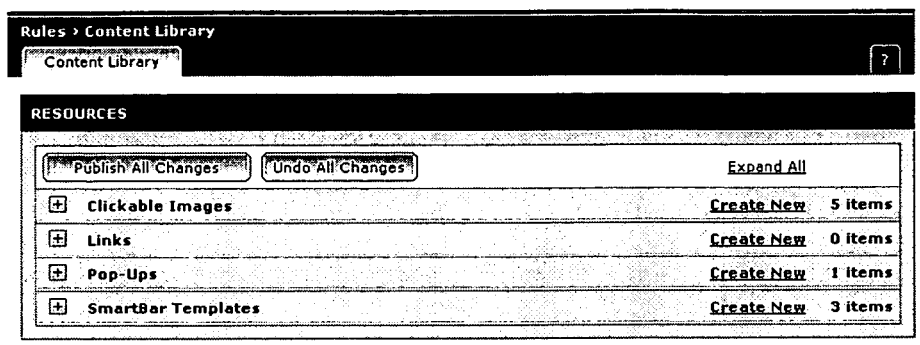

FIG. 4A depicts one embodiment of the content library used to generate SmartBar™ cell content. The user can select from clickable images, links, pop-ups, and SmartBar™ templates and the like. In a preferred embodiment, the user can create and modify content. The "create new" button generates a screen such as the one shown in FIG. 4B.

Figure 4C:
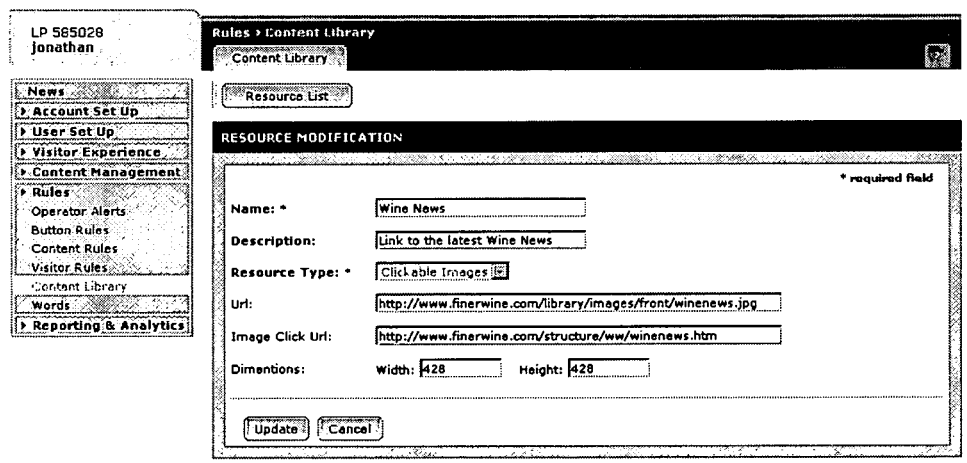
Figure 4B:
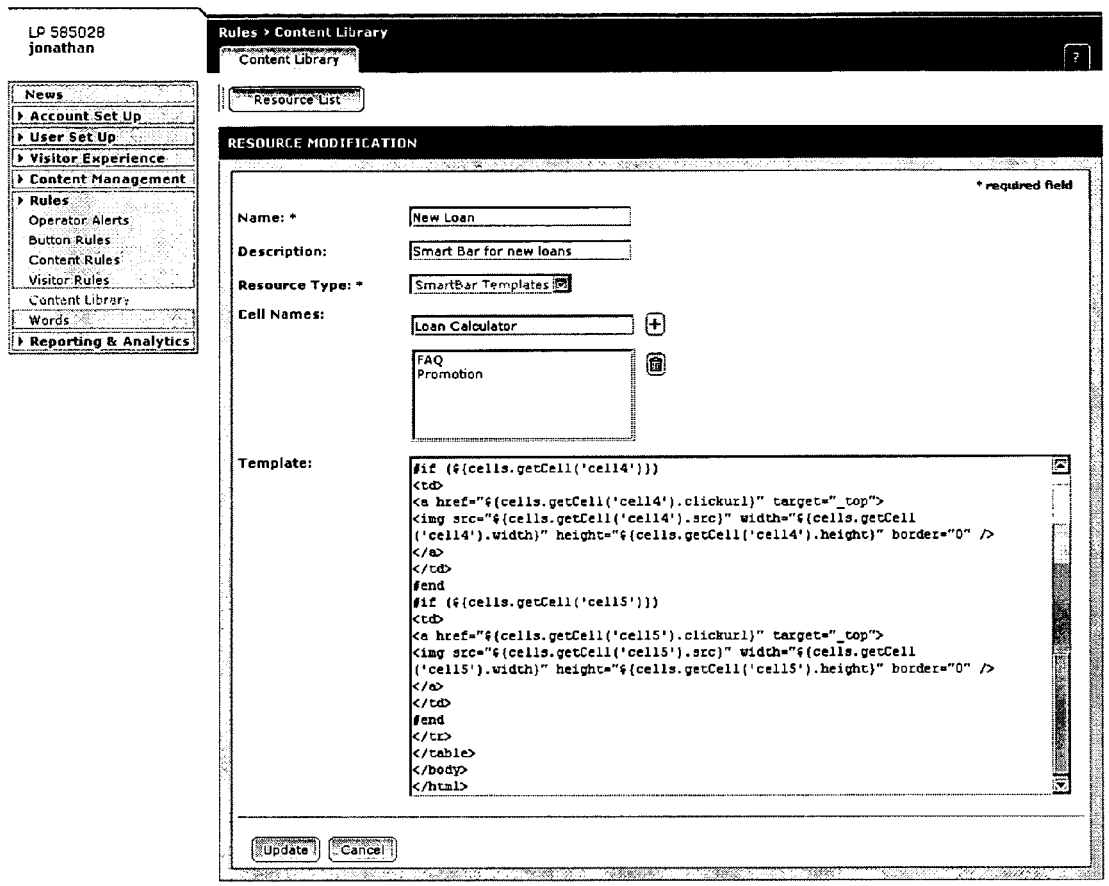

FIG. 4B is a template editor. A user can name and describe a template and link the template to various promotions. Further, the template provides an area whereby HTML code is entered to generate the cells.

As shown in FIG. 4C, a clickable image is defined. The marketer enters the name, description, resource type URL, destination URL. In a preferred embodiment, the user enters the height and width of the clickable content on this screen. Further, once the template is established, rules are associated with the specific SmartBar™.

Figures 4D, 4E:
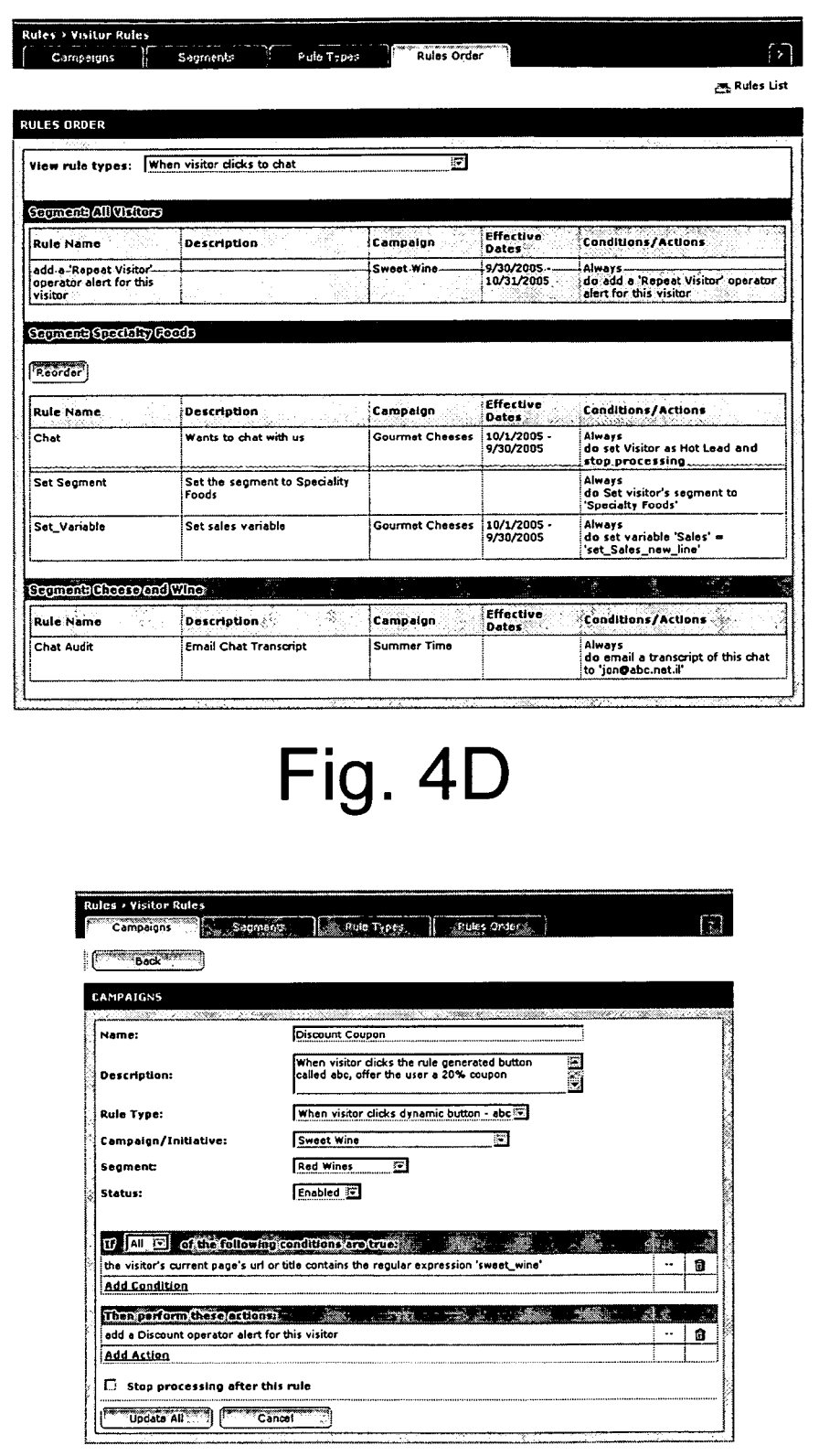

FIG. 4D shows various rule types that will trigger a SmartBar™ template and the rule priorities within each type. Rule types include clicking a dynamic button, entering a page, entering a site, click-to-chat, leaving a site, browsing a site, and the like. Each of these rule types can designate a specific activity or group of activities. Additionally, other pop-ups or content is displayed based on rules and user activity as discussed above.

In one embodiment, rules can be organized under campaigns (FIG. 4E). Campaigns can be setup for a specific period of time.

It should be noted that in another embodiment, a user first establishes rules, then groups these rules into campaigns. After the rules and campaigns are established, SmartBar™ templates are generated to support the campaigns. Further, because the generation of the SmartBar™ cells, the business rules, and the web layout are discreet activities, no specific order is required for the overall implementation. In a preferred embodiment, a user defines a campaign. Rules are then written or selected to accomplish the campaign.

The present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

In the specification, the term "media" means any medium that can record data therein. The term "media" includes, for instance, a disk shaped media for such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program therein.

A recording media storing a program for accomplishing the above mentioned apparatus maybe accomplished by programming functions of the above mentioned apparatuses with a programming language readable by a computer or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device, any suitable device for performing computations in accordance with a computer program may be used. Examples of such devices include a personal computer, a laptop computer, a microprocessor, a programmable logic device, or an application specific integrated circuit.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A computer-implemented method, comprising:
providing, by a server device, a toolbar including one or more cells for displaying content resources, wherein the toolbar is dynamically generated and persistently displayed as an additional window over one or more webpages of a website;
providing a plurality of content resources, wherein the plurality of content resources include resources of different content types, wherein at least one content resource includes a real-time interactive element that facilitates a chat communication with an available agent, and wherein an agent is available when the agent is available to participate in the chat communication and has a skill specified by the website;
dynamically updating display and content type of content resources presented in cells of the toolbar, wherein the display and content type of the content resources are dynamically updated in real-time as activities are performed on the website and as content of the website changes, wherein the display and content type of the content resources are dynamically updated using one or more content resource rules, and wherein the one or more content resource rules control a type of content resource to present in the toolbar based on one or more activities performed on one or more webpages of a website and based on content of the one or more webpages;
receiving a request for a content resource, wherein the request is based on one or more detected activities performed on the one or more webpages of the website;
selecting a content resource rule according to the one or more detected activities performed on the one or more webpages of the website, wherein the content resource rule is evaluated to determine whether to provide a real-time interactive element that facilitates a chat communication;
using the selected content resource rule to determine whether one or more agents are available to participate in a chat communication, wherein the selected content resource rule is further used to determine whether the one or more agents have a skill specified by the website;
dynamically selecting a content resource using the selected content resource rule when the one or more agents are determined to be available to participate in a chat communication and to have the skill specified by the website, wherein the content resource includes a real-time interactive element that facilitates a chat communication between an agent device of an available agent having the skill and a customer device;
providing the selected content resource for presentation in at least one of the cells of the toolbar displayed over the one or more webpages, wherein content resources of different content types are presented within different cells of the toolbar, and wherein selection of the real-time interactive element facilitates a chat communication between an agent device associated with an available agent and a customer device;
receiving, by the server device, input corresponding to selection of the real-time interactive element; and
facilitating, by the server device, the chat communication between the customer device and the agent device of the available agent having the skill.

2. The method of claim 1, wherein the content resource rules further control content resource presentation using past activities performed on the web site.

3. The method of claim 1, wherein the content resource rules further control content resource presentation using an Internet Protocol address.

4. The method of claim 1, wherein a server is dedicated to select the content resource rules and provide the selected content resource for presentation in at least one of the cells of the toolbar according to the selected content resource rule.

5. The method of claim 4, wherein content for the one or more webpages of the website is provided by a first server, and wherein the dedicated server provides the selected content resource to the first server.

6. The method of claim 1, wherein a delivery format of the selected content resource is determined by the selected content resource rule.

7. The method of claim 6, wherein the delivery format includes one or more of an overlay or a popup.

8. The method of claim 1, wherein the one or more cells are populated with the content resources of the different content types simultaneously.

9. The method of claim 1, wherein the toolbar including the one or more cells is placed in a same location on each webpage of the website.

10. The method of claim 1, wherein each cell of the toolbar is associated with a particular marketing objective.

11. A server device, comprising:
a processor; and
a non-transitory computer-readable storage medium containing instructions configured to cause the processor to perform operations including:
providing a toolbar including one or more cells for displaying content resources, wherein the toolbar is dynamically generated and persistently displayed as an additional window over one or more webpages of a website;
providing a plurality of content resources, wherein the plurality of content resources include resources of different content types, wherein at least one content resource includes a real-time interactive element that facilitates a chat communication with an available agent, and wherein an agent is available when the agent is available to participate in the chat communication and has a skill specified by the website;
dynamically updating display and content type of content resources presented in cells of the toolbar, wherein the display and content type of the content resources are dynamically updated in real-time as activities are performed on the website and as content of the web site changes, wherein the display and content type of the content resources are dynamically updated using one or more content resource rules, and wherein the one or more content resource rules control a type of content resource to present in the toolbar based on one or more activities performed on one or more webpages of a website and based on content of the one or more webpages;
receiving a request for a content resource, wherein the request is based on one or more detected activities performed on the one or more webpages of the website;
selecting a content resource rule according to the one or more detected activities performed on the one or more webpages of the website, wherein the content resource rule is evaluated to determine whether to provide a real-time interactive element that facilitates a chat communication;

using the selected content resource rule to determine whether one or more agents are available to participate in a chat communication, wherein the selected content resource rule is further used to determine whether the one or more agents have a skill specified by the website;

dynamically selecting a content resource using the selected content resource rule when the one or more agents are determined to be available to participate in a chat communication and to have the skill specified by the website, wherein the content resource includes a real-time interactive element that facilitates a chat communication between an available agent device having the skill and a customer device; and providing the selected content resource for presentation in at least one of the cells of the toolbar displayed over the one or more webpages, wherein content resources of different content types are presented within different cells of the toolbar, and wherein selection of the real-time interactive element facilitates a chat communication between an agent device associated with an available agent and a customer device;

receiving, by the server device, input corresponding to selection of the real-time interactive element; and facilitating, by the server device, the chat communication between the customer device and the agent device of the available agent having the skill.

12. The system of claim 11, wherein the content resource rules further control content resource presentation using past activities performed on the web site.

13. The system of claim 11, wherein the content resource rules further control content resource presentation using an Internet Protocol address.

14. The system of claim 11, wherein a server is dedicated to select the content resource rules and provide the selected content resource for presentation in at least one of the cells of the toolbar according to the selected content resource rule.

15. The system of claim 14, wherein content for the one or more webpages of the website is provided by a first server, and wherein the dedicated server provides the selected content resource to the first server.

16. The system of claim 11, wherein a delivery format of the selected content resource is determined by the selected content resource rule.

17. The system of claim 16, wherein the delivery format includes one or more of an overlay or a popup.

18. The system of claim 11, wherein the one or more cells are populated with the content resources of the different content types simultaneously.

19. The system of claim 11, wherein the toolbar including the one or more cells is placed in a same location on each webpage of the website.

20. The system of claim 11, wherein each cell of the toolbar is associated with a particular marketing objective.

21. A computer-program product, tangibly embodied in a non-transitory machine-readable medium of a server device, including instructions configured to cause a data processing apparatus to:

provide a toolbar including one or more cells for displaying content resources, wherein the toolbar is dynamically generated and persistently displayed as an additional window over one or more webpages of a website;

provide a plurality of content resources, wherein the plurality of content resources include resources of different content types, wherein at least one content resource includes a real-time interactive element that facilitates a chat communication with an available agent, and wherein an agent is available when the agent is available to participate in the chat communication and has a skill specified by the website;

dynamically update display and content type of content resources presented in cells of the toolbar, wherein the display and content type of the content resources are dynamically updated in real-time as activities are performed on the website and as content of the website changes, wherein the display and content type of the content resources are dynamically updated using one or more content resource rules, and wherein the one or more content resource rules control a type of content resource to present in the toolbar based on one or more activities performed on one or more webpages of a web site and based on content of the one or more webpages;

receive a request for a content resource, wherein the request is based on one or more detected activities performed on the one or more webpages of the website;

select a content resource rule according to the one or more detected activities performed on the one or more webpages of the website, wherein the content resource rule is evaluated to determine whether to provide a real-time interactive element that facilitates a chat communication;

use the selected content resource rule to determine whether one or more agents are available to participate in a chat communication, wherein the selected content resource rule is further used to determine whether the one or more agents have a skill specified by the website;

dynamically select a content resource using the selected content resource rule when the one or more agents are determined to be available to participate in a chat communication and to have the skill specified by the website, wherein the content resource includes a real-time interactive element that facilitates a chat communication between an available agent device having the skill and a customer device; and provide the selected content resource for presentation in at least one of the cells of the toolbar displayed over the one or more webpages, wherein content resources of different content types are presented within different cells of the toolbar, and wherein selection of the real-time interactive element facilitates a chat communication between an agent device associated with an available agent and a customer device;

receive input corresponding to selection of the real-time interactive element; and facilitate the chat communication between the customer device and the agent device of the available agent having the skill.

22. The computer-program product of claim 21, wherein the content rules further control content resource presentation using past activities performed on the website.

23. The computer-program product of claim 21, wherein the content rules further control content resource presentation using an Internet Protocol address.

24. The computer-program product of claim 21, wherein a server is dedicated to select the content rules and provide the selected content resource for presentation in at least one of the cells of the toolbar according to the selected content rule.

25. The computer-program product of claim 24, wherein content for the one or more webpages of the website is provided by a first server, and wherein the dedicated server provides the selected content resource to the first server.

26. The computer-program product of claim 21, wherein a delivery format of the selected content resource is determined by the selected content resource rule.

27. The computer-program product of claim 26, wherein the delivery format includes one or more of an overlay or a popup.

28. The computer-program product of claim 21, wherein the one or more cells are populated with the content resources of the different content types simultaneously.

29. The computer-program product of claim 21, wherein the toolbar including the one or more cells is placed in a same location on each webpage of the web site.

30. The computer-program product of claim 21, wherein each cell of the toolbar is associated with a particular marketing objective.

* * * * *